United States Patent
Mohanakrishnan et al.

(10) Patent No.: US 9,740,930 B2
(45) Date of Patent: Aug. 22, 2017

(54) READ DETERMINING DEVICE AND METHOD

(71) Applicant: FUJITSU LIMITED, Kawasaki-shi, Kanagawa (JP)

(72) Inventors: Jaikrishna Mohanakrishnan, Kawasaki (JP); Akinori Taguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 193 days.

(21) Appl. No.: 14/629,811

(22) Filed: Feb. 24, 2015

(65) Prior Publication Data
US 2015/0302247 A1    Oct. 22, 2015

(30) Foreign Application Priority Data
Apr. 17, 2014   (JP) ................ 2014-085562

(51) Int. Cl.
| | |
|---|---|
| *G06K 9/00* | (2006.01) |
| *G06K 9/62* | (2006.01) |
| *G06F 3/01* | (2006.01) |
| *G06Q 10/00* | (2012.01) |

(52) U.S. Cl.
CPC ......... *G06K 9/00469* (2013.01); *G06F 3/013* (2013.01); *G06K 9/00483* (2013.01); *G06K 9/00604* (2013.01); *G06K 9/6215* (2013.01); *G06Q 10/00* (2013.01)

(58) Field of Classification Search
None
See application file for complete search history.

(56) References Cited

U.S. PATENT DOCUMENTS

| | | | |
|---|---|---|---|
| 6,043,823 A | | 3/2000 | Kodaira et al. |
| 7,139,756 B2 * | | 11/2006 | Cooper ............... G06F 17/3061 |
| 2008/0235340 A1 | | 9/2008 | Kumazawa et al. |
| 2013/0027302 A1 | | 1/2013 | Iwaizumi et al. |
| 2013/0300654 A1 | | 11/2013 | Seki |

(Continued)

FOREIGN PATENT DOCUMENTS

| | | |
|---|---|---|
| JP | 08-034702 | 2/1996 |
| JP | 09-091450 | 4/1997 |
| JP | 09-179868 | 7/1997 |

(Continued)

OTHER PUBLICATIONS

Therrien, Fluency and Comprehension Gains as a Result of Repeated Reading, Remedial and Special Education, 2004.*

(Continued)

*Primary Examiner* — Mark Roz
(74) *Attorney, Agent, or Firm* — Staas & Halsey LLP

(57) ABSTRACT

A read determining device includes: a similar portion identifying unit configured to identify a similar portion in a document which is similar to a portion in the document or a similar portion in a document which is similar to a portion in another document which is already read; and a determination unit that lowers a threshold value with which a document is determined to be read with respect to the document which includes more similar portions than those in another document which includes less similar portions and thereby determines whether or not the document is read, so that the determination accuracy is improved.

10 Claims, 42 Drawing Sheets

(56) References Cited

U.S. PATENT DOCUMENTS

2013/0307771 A1    11/2013    Parker et al.

FOREIGN PATENT DOCUMENTS

| | | |
|---|---|---|
| JP | 10-162020 | 6/1998 |
| JP | 2001-195319 | 7/2001 |
| JP | 2002-056357 | 2/2002 |
| JP | 2003-296638 | 10/2003 |
| JP | 2003-345335 | 12/2003 |
| JP | 2006-107048 | 4/2006 |
| JP | 2006-235722 | 9/2006 |
| JP | 2008-234136 | 10/2008 |
| JP | 2008-269069 | 11/2008 |
| JP | 2010-039646 | 2/2010 |
| JP | 2011-203880 | 10/2011 |
| JP | 2013-152564 | 8/2013 |

OTHER PUBLICATIONS

Chang, Improving reading rates and comprehension through timed repeated reading, Reading in a Foreign Language Oct. 2013.*
Extended European Search Report dated Jul. 30, 2015 in corresponding European Patent Application No. 15157375.5.
European Office Action mailed Apr. 4, 2016 in related European Application No. 15157375.5.

* cited by examiner

| REGION | CRITERIA<br>[READING SPEED<br>(CHARACTERS/SECOND)] |
|---|---|
| REPETITIVE REGION | 20 |
| NON-REPETITIVE REGION | 10 |

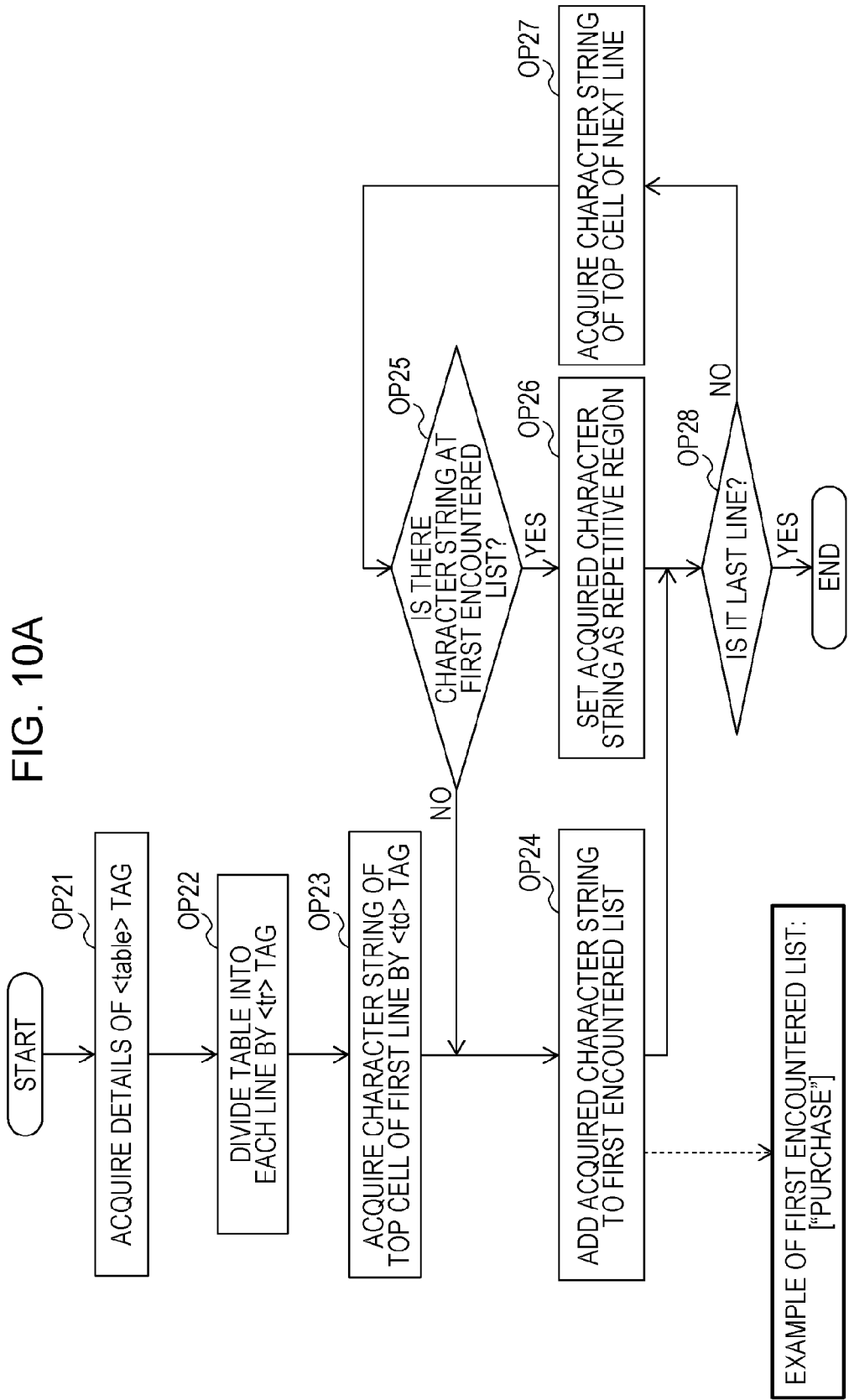

FIG. 10B

```
<html>
<body>
PRODUCT SEARCHING RESULT
<table>
<tr><td> PURCHASE </td> <td>LCD 24" (20,455 Yen)</td> <td><img src="img1.jpg"></td></tr>
<tr><td> PURCHASE </td> <td>LCD 21" (17,320 Yen)</td> <td><img src="img2.jpg"></td></tr>
<tr><td> PURCHASE </td> <td>CRT 21" (12,100 Yen)</td> <td><img src="img3.jpg"></td></tr>
<tr><td> PURCHASE </td> <td>TFT 40" (120,400 Yen)</td> <td><img src="img4.jpg"></td></tr>
</table>
</body>
</html>
```

FIG. 11

GOODBYE SALE! (UNTIL DECEMBER 02)

RICE COOKER

| MAKER | A COMPANY |
|---|---|
| PRICE | 12,000 YEN |
| CONDITION | NEW PRODUCT |

TELEVISION (ANALOG)

| MAKER | B COMPANY |
|---|---|
| CONDITION | SECONDHAND GOODS |
| PRICE | 2,000 YEN |

BICYCLE

| MAKER | X COMPANY |
|---|---|
| CONDITION | BROKEN DOWN |
| PRICE | FREE |

PLEASE CONTACT US BY DECEMBER 02.

FIG. 12B

| REGION | CRITERIA $\begin{bmatrix} \text{READING SPEED} \\ \text{(CHARACTERS/SECOND)} \end{bmatrix}$ |
|---|---|
| SIMILAR REGION | 20 |
| DISSIMILAR REGION | 10 |

FIG. 13C

```
<html>
<body>
GOODBYE SALE! (UNTIL DECEMBER 02)<br>
RICE COOKER
<table>
<tr><td>MAKER</td> <td>A COMPANY</td> </tr>
<tr><td>PRICE</td> <td>12,000 YEN</td> </tr>
<tr><td>CONDITION</td> <td>NEW PRODUCT</td> </tr>
</table>
TELEVISION (ANALOG)<br>
<table>
<tr><td>MAKER</td> <td>B COMPANY</td> </tr>
<tr><td>CONDITION</td> <td>SECONDHAND GOODS</td> </tr>
<tr><td>PRICE</td> <td>2,000 YENS</td> </tr>
</table>
BICYCLE<br>
<table>
<tr><td>MAKER</td> <td>X COMPANY</td> </tr>
<tr><td>CONDITION</td> <td>BROKEN DOWN</td> </tr>
<tr><td>PRICE</td> <td>FREE</td> </tr>
</table>
PLEASE CONTACT US AT xxx-0000-1111 BY DECEMBER 02.
</body>
</html>
```

FIG. 14
| PERSONAL COMPUTER PERIPHERALS INSTALLMENT CAMPAIGN!! | | |
|---|---|---|
| PRODUCT NAME | SMALL-SIZED DISPLAY |  |
| SPECIFICATION | LCD 12" | |
| PRICE | 12,000 YEN | |
| PRODUCT NAME | DISPLAY |  |
| PRICE | 17,320 YEN | |
| SPECIFICATION | LCD 21" | |
| PRODUCT NAME | MONITOR | 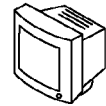 |
| SPECIFICATION | CRT 21" | |
| PRICE | 12,100 YEN | |
| PRODUCT NAME | LARGE-SIZED DISPLAY |  |
| SPECIFICATION | TFT 40" | |
| PRICE | 120,400 YEN | |

FIG. 20B

| LANGUAGE PAIR | WRITTEN |
|---|---|
| JAPANESE AND ENGLISH | "English follows Japanese" |
| ENGLISH AND JAPANESE | JAPANESE FOLLOWS ENGLISH |

FIG. 20C

| USER NAME | NATIVE LANGUAGE |
|---|---|
| User1 | JAPANESE |
| User2 | ENGLISH |

FIG. 20D

| REGION | CRITERIA [READING SPEED (CHARACTERS/SECOND)] |
|---|---|
| NATIVE LANGUAGE REGION | 10 |
| NON-NATIVE LANGUAGE REGION | 100000 |

FIG. 24B

| USER NAME | SCHOOL YEAR |
|---|---|
| User1 | COLLEGE GRADUATE |
| User2 | JUNIOR IN ELEMENTARY SCHOOL |

FIG. 24C

| CONDITION | CRITERIA [ READING SPEED (CHARACTERS/SECOND) ] |
|---|---|
| USER IS MIDDLE SCHOOL THIRD GRADER OR UNDER AND JAPANESE CHARACTER IS NOT COMMONLY-USED JAPANESE CHARACTER | RUBY REGION HAS TO BE READ (EIGHT CHARACTERS/SECOND) |
| USER IS HIGH SCHOOL FIRST GRADER OR HIGHER OR JAPANESE CHARACTER IS COMMONLY-USED JAPANESE CHARACTER | NEW CHARACTER REGION (TEN CHARACTERS/SECOND) HAS TO BE READ |

FIG. 26B

| USER NAME | SPECIALTY |
|---|---|
| User1 | IT |
| User2 | MEDICINE |

FIG. 26C

| CONDITION | CRITERIA $\begin{bmatrix} \text{READING SPEED} \\ \text{(CHARACTERS/SECOND)} \end{bmatrix}$ |
|---|---|
| JAPANESE CHARACTER IS IT TECHNICAL TERM AND USER'S SPECIALTY IS NOT IT | NEW CHARACTER REGION (TEN CHARACTERS/SECOND) AND RUBY REGION (EIGHT CHARACTERS/SECOND) HAS TO BE READ |
| JAPANESE CHARACTER IS NOT IT TECHNICAL TERM OR USER'S SPECIALTY IS IT | NEW CHARACTER REGION (TEN CHARACTERS/SECOND) HAS TO BE READ |

FIG. 28B

| USER NAME | IT SPECIALTY LEVEL |
|---|---|
| User1 | LOW |
| User2 | HIGH |

FIG. 28C

| CONDITION | CRITERIA [READING SPEED (CHARACTERS/SECOND)] |
|---|---|
| ABBREVIATION IS IT TECHNICAL TERM AND USER HAS LOW IT KNOWLEDGE | ABBREVIATION REGION (TEN CHARACTERS/SECOND) AND WORD REGION (EIGHT CHARACTERS/SECOND) HAS TO BE READ |
| ABBREVIATION IS NOT IT TECHNICAL TERM OR USER HAS HIGH IT KNOWLEDGE | ABBREVIATION REGION (TEN CHARACTERS/SECOND) HAS TO BE READ |

READ DETERMINING DEVICE AND METHOD

CROSS-REFERENCE TO RELATED APPLICATION

This application is based upon and claims the benefit of priority of the prior Japanese Patent Application No. 2014-085562, filed on Apr. 17, 2014 the entire contents of which are incorporated herein by reference.

FIELD

The embodiments discussed herein are related to a read determining device, a read determining method, and a read determining program.

BACKGROUND

Currently, various documents are used in a form of digital data. The Web, email, a social network service (SNS), or an e-book is widely used in real life. Among the documents, it is convenient when there is a confirmation of a document being read is included. In addition, when these documents are neglected without being read, a smooth communication with the documents is not formed in some cases. In order to avoid such a problem, a function of determining whether or not a document is read is demanded.

In the related art, a method of determining email as read email when an opening operation of the email is performed and a method of determining how much email is read according to a display time of the email are known. In addition, a method of determining that a document is read is known for a common document without being limited to email, in a case where time for which the document is viewed exceeds time for which details of the document is understood. Further, using a line-of-sight detecting technology, a method of determination of reading of a document is proposed.

For example, see Japanese Laid-open Patent Publication Nos. 2006-235722, 2010-39646, 2006-107048, 2001-195319, 2008-234136, and 2003-296638.

In the related art, in a case where it is determined whether or not a document is read, there is a precondition that each region in the document is read in the same way, for example, is read at the same speed. However, when a user actually reads a document, the user reads the document using a different method depending on a region. For example, since a snippet or the like in a known form does not need a closer look, it is possible to read a region of the snippet for a shorter time than to read another region. In addition, since it is possible to predict the details of the region that is similar to a read region, it is easy to understand the details and it is possible to read the read region for a shorter time. However, when a precondition is provided, that each region in the document is read in the same way, the number of characters of a portion which does not need a close look is counted into the total number of characters of the document and time for which the document is read is determined according to the total number of characters. In this case, although a user actually reads the document, incorrect determination is performed, in some cases, that the document is not read fully if the time taken for the relevant number of characters is not displayed.

An aspect of the disclosure aims to provide a read determining device, a read determining method, and a read determining program in which it is possible to reduce cases of incorrect determination when it is determined whether or not the document is read.

SUMMARY

According to an aspect of the invention, a read determining device includes: a similar portion identifying unit configured to identify a similar portion in a document which is similar to a portion in the document or a similar portion in a document which is similar to a portion in another document which is already read; and a determination unit that lowers a threshold value with which a document is determined to be read with respect to the document which includes more similar portions than those in another document which includes less similar portions and thereby determines whether or not the document is read, so that the determination accuracy is improved.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10A illustrates an example of a flowchart of a process of identifying the repetitive region in the document in FIG. 3;

FIG. 10B illustrates an example of a Hyper Text Markup Language (HTML) source code which defines the table illustrated in FIG. 3;

FIG. 11 illustrates an example in which a document including a similar region is divided;

FIG. 12B illustrates an example of a criteria table in which criteria of determining a document including a similar region are defined;

FIG. 13C illustrates an example of an HTML source code which defines the table illustrated in FIG. 11;

FIG. 14 illustrates an example of a document including a similar region;

FIG. 20B illustrates an example of a same-details table in which a writing example indicating that the same details are written in two languages in a document in which the same details are written in two languages is defined;

FIG. 20C illustrates an example of a user information table in which user information is defined, which is related to a user who reads the document in which the same details are written in two languages;

FIG. 20D illustrates an example of a criteria table in which criteria of determining the document in which the same details are written in two languages are defined;

FIG. 24B illustrates an example of a user information table in which user information is defined, which is related to a user who reads the document with the attached ruby;

FIG. 24C illustrates an example of a criteria table in which criteria of determining the document with the attached ruby are defined;

FIG. 28B illustrates an example of a user information table in which user information is defined, which is related to a user who reads the document in which a word representing an abbreviation is written together with the abbreviation of a technical term;

FIG. 28C illustrates an example of a criteria table in which criteria of determining the document in which a word representing an abbreviation is written together with the abbreviation of a technical term are defined;

DESCRIPTION OF EMBODIMENTS

Hereinafter, embodiments of the disclosure will be described based on the drawings. Configurations of the following embodiments are examples and the disclosure is not limited to the configurations of the embodiments. Examples included in the embodiments illustrate examples of processes of a read determining device 10. The read determining device 10 according to the embodiment determines whether or not a determination target document is read by a user.

Figure 1:
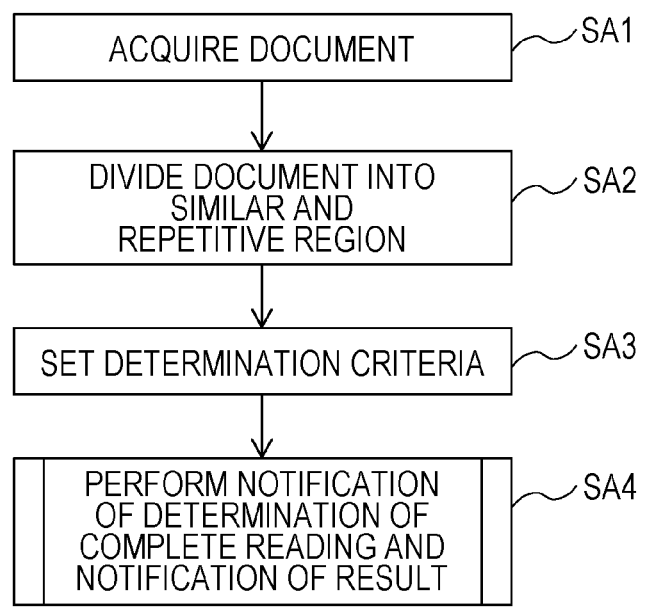
FIG. 1 illustrates an example of a flowchart of a process of determining whether or not a document is read.
Figure 2A:
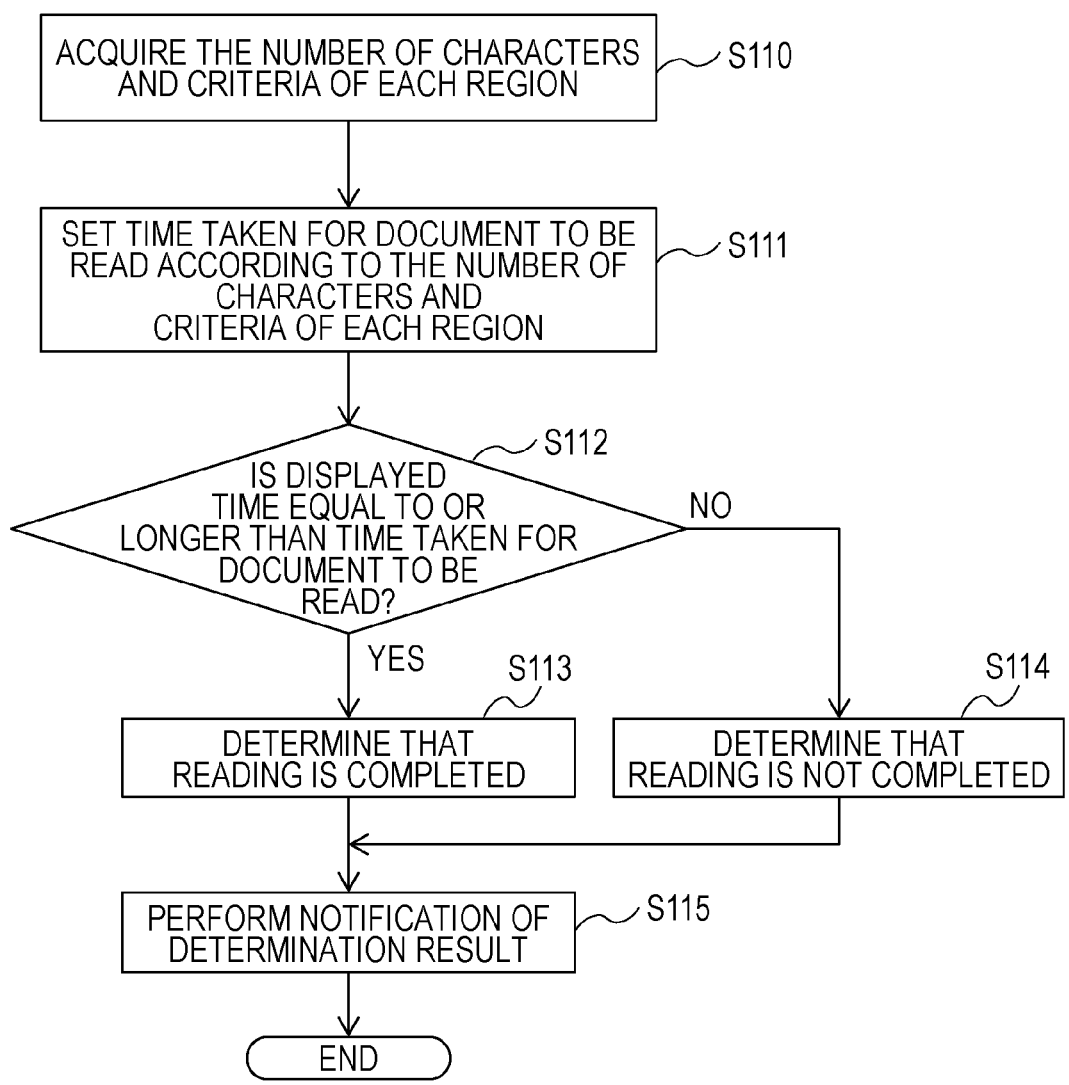
FIG. 2A illustrates an example of a flowchart of a process of determining whether or not the document is read with an opening time of the document as a reference time.
Figure 2B:
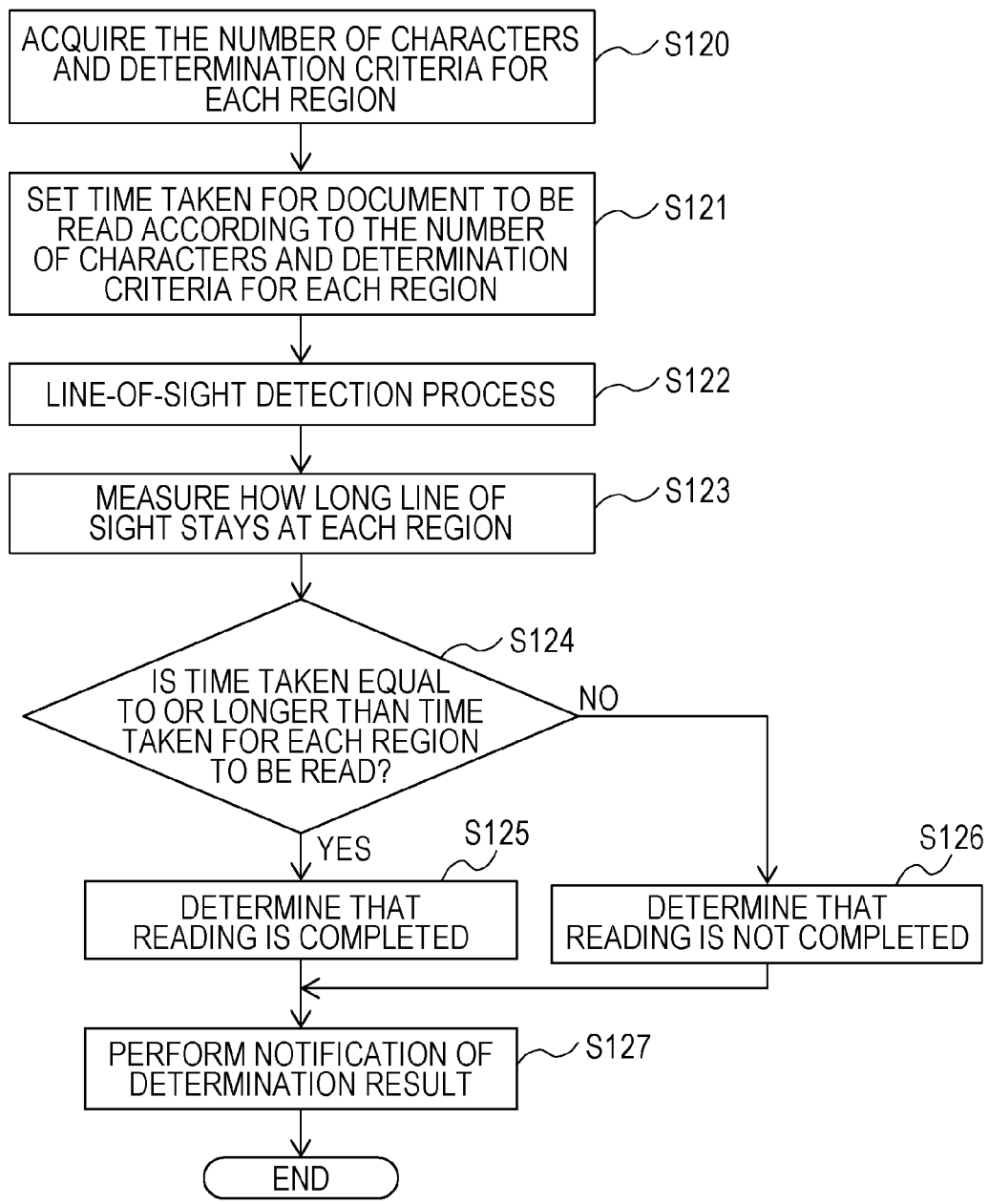
FIG. 2B illustrates an example of a flowchart of a process of determining whether or not the document is read with a gazing time measured by detecting a line of sight as a reference time.

FIG. 1, FIG. 2A, and FIG. 2B illustrate processes of determining whether or not a determination target document is read by a user, respectively. FIG. 1 illustrates an example of a flowchart of a process of determining whether or not a document is read. The process in FIG. 1 starts, for example, when the determination target document is displayed on an output device 14.

In SA1, the read determining device 10 acquires the determination target document and proceeds to the process in SA2. In SA2, the read determining device 10 divides the determination target document so as to identify a similar region or a repetitive region and proceeds to the process in SA3. In SA3, the read determining device 10 sets criteria with respect to each divided region in the document and proceeds to the process in SA4. In SA4, the read determining device 10 determines whether or not the determination target document is read by the user and performs notifying a determination result such that the process ends.

FIG. 2A and FIG. 2B illustrate a flowchart of a process in SA4 of FIG. 1, that is, a process of performing the determination of reading completion and of notification of the result. FIG. 2A illustrates an example of a flowchart of a process of determining whether or not the document is read with a view time of the document as a reference time. The process in FIG. 2A starts, for example, when the read determining device 10 proceeds to the process of performing determination of the reading completion and notification of the result in SA4 of FIG. 1.

In S110, the read determining device 10 acquires the number of characters and criteria of each region and proceeds to the process in S111. In S111, the read determining device 10 sets a predicted reading time taken for the determination target document to be read with reference to the number of characters and the criteria of each region and proceeds to the process in S112. In S112, the read determining device 10 determines whether or not the determination target document is displayed for the predicted reading time or longer; then, proceeds to the process in S113 in a case where the determination target document is displayed for the predicted reading time or longer, and proceeds to the process in S114 in a case where the determination target document is not displayed for the predicted reading time or longer. In S113, the read determining device 10 determines that the determination target document is read and proceeds to the process in S115. In S114, the read determining device 10 determines that the determination target document is not read and proceeds to the process in S115. In S115, the read determining device 10 notifies a user of a determination result of whether or not the determination target document is read and ends the process.

FIG. 2B illustrates an example of a flowchart of a process of determining whether or not the document is read with a gazing time measured by detecting a line of sight as a reference time. The process in FIG. 2B starts, for example, when the read determining device 10 proceeds to the process of performing determination of the reading completion and notification of the result in SA4 of FIG. 1.

In S120, the read determining device 10 acquires the number of characters and criteria of each region and proceeds to the process in S121. In S121, the read determining device 10 sets a predicted reading time taken for the determination target document to be read with reference to the number of characters and the criteria of each region and proceeds to the process in S122. In S122, the read determining device 10 detects a user's line of sight and proceeds to the process in S123. In S123, the read determining device 10 measures a time for which the line of sight detected in S122 stays in each region and proceeds to the process in S124. In S124, the read determining device 10 determines whether or not each region is gazed at for the predicted reading time or longer; then, proceeds to the process in S125 in a case where each region is gazed at for the predicted reading time or longer, and proceeds to the process in S126 in a case where each region is not gazed at for the predicted reading time or longer. In S125, the read determining device 10 determines that the determination target document is read and proceeds to the process in S127. In S126, the read determining device 10 determines that the determination target document is not read and proceeds to the process in S127. In S127, the read determining device 10 notifies a user of a determination result of whether or not the determination target document is read and ends the process.

Example 1

According to Example 1, the determination target document processed by the read determining device 10 is assumed to be a document in which a character string which is the same as or similar to the first encountered character string is repeatedly displayed. A region (hereinafter, also referred to as a repetitive region) in which the character string which is the same as or similar to the first encountered character string is repeatedly displayed may be read faster than a region where the first encountered character strings are displayed. For example, when the number of characters (hereinafter, also referred to as a reading speed) which are readable per unit time corresponds to a criterion, the read determining device 10 sets a reading speed faster for a repetitive region than that for a region where the character strings are not repetitive. Accordingly, a reading time for the repetitive region which is predicted based on the criteria and an amount of information becomes shorter than the predicted reading time for a non-repetitive region and a threshold value of the predicted reading time for determining that the document is read is lowered.

Figure 3:
FIG. 3 illustrates an example of a document including a repetitive region.

FIG. 3 illustrates an example of the determination target document according to Example 1. FIG. 3 illustrates an example of a document including a repetitive region. In FIG. 3, as a product searching result, four displays are displayed in a type of table. The table is configured to have three columns and, in each row of the left-hand end column, a character string of "purchase" is displayed. In the center column, a product name of each display is displayed. In the right-hand end column, an image of each of the displays is displayed. In the left-hand end column, the character string of "purchase" is repeatedly displayed and a region which includes the character string of "purchase" displayed from the second row is determined as a repetitive region. The repetitive region is an example of a similar portion. In addition, a region in which a character string is not repetitive is an example of a dissimilar portion.

Configuration of Hardware

Figure 4:
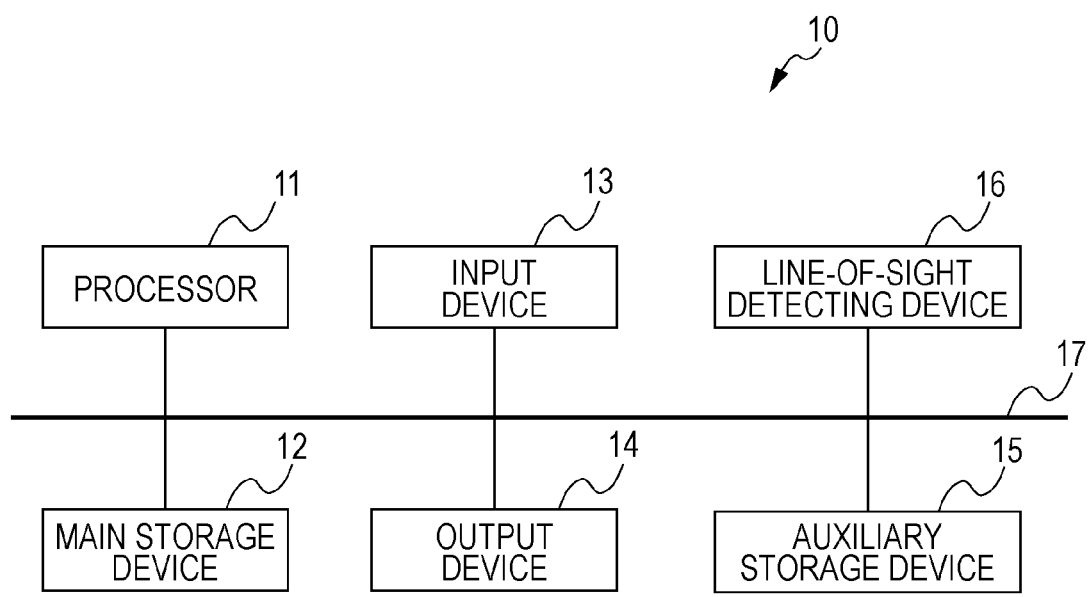
FIG. 4 illustrates an example of a hardware configuration of a read determining device.

FIG. 4 illustrates an example of a hardware configuration of a read determining device 10. The read determining device 10 includes a processor 11, a main storage device 12, an input device 13, the output device 14, an auxiliary storage device 15, and a line-of-sight detecting device 16, which are connected to each other through a bus 17.

The processor 11 executes a computer program which is expanded to be executable on the main storage device 12. Here, a part of a process executed by the computer program may be executed by hardware circuitry. The processor 11 corresponds to, for example, a central processing unit (CPU) or a digital signal processor (DSP).

The main storage device 12 provides a storage area or a work area, in which a computer program retained in the auxiliary storage device 15 is loaded, to the processor 11. In addition, the main storage device 12 is used as a buffer so as to hold data temporarily. The main storage device 12 is, for example, a semiconductor memory such as a random access memory (RAM).

The input device 13 receives an operation input by a user. For example, the input device 13 is a circuit or the like which receives a signal from a pointing device such as a touch pad, a mouse, or a touch panel, a keyboard, an operation button, or a remote control. The output device 14 outputs a read determining result of a document by the read determining device 10. The output device 14 is, for example, a liquid crystal display (LCD).

The auxiliary storage device 15 retains various computer programs or data which is used by the processor 11 when each of the computer programs is executed. The read determining device 10 may include, for example, a nonvolatile memory such as an erasable programmable read only memory (EPROM) or a flash memory, instead of the auxiliary storage device 15.

The line-of-sight detecting device 16 detects a user's line of sight and computes a position which is gazed at on a screen. The line-of-sight detecting device 16 includes, for example, an infrared LED and an infrared camera.

The hardware configuration of the read determining device 10 is not limited to the configuration in FIG. 2, but an appropriate modification such as an addition of or replacement with a new component or removal of a component may be performed. The read determining device 10 is a device for reading a document including character information, for example, a mobile phone terminal, a smart phone, a tablet terminal, an e-book terminal, a personal computer (PC), a wearable terminal, or a signage.

Process Block

Figures 5A, 5B:
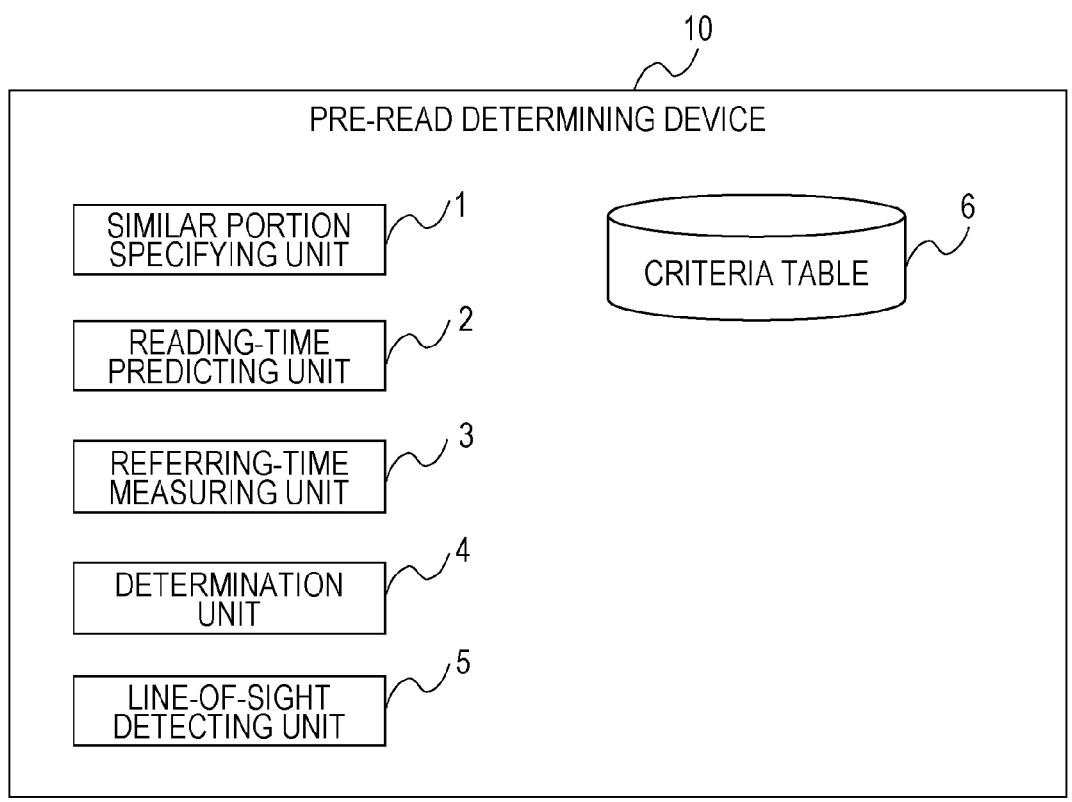
FIG. 5A illustrates an example of a block in which a process of the read determining device according to Example 1 is executed.
FIG. 5B illustrates an example of a criteria table in which criteria of determining the document including the repetitive region are defined.

FIG. 5A illustrates an example of a block in which a process of the read determining device 10 according to Example 1 is executed. In FIG. 5A, the read determining device 10 includes a similar portion identifying unit 1, a reading-time predicting unit 2, a reference time measuring unit 3, a determination unit 4, a line-of-sight detecting unit 5, and a criteria table 6. The processor 11 of the read determining device 10 executes processes of the similar portion identifying unit 1, the reading-time predicting unit 2, the reference time measuring unit 3, the determination unit 4, and the line-of-sight detecting unit 5 using the computer program. Here, a part of these processes of or any one of the similar portion identifying unit 1, the reading-time predicting unit 2, the reference time measuring unit 3, the determination unit 4, and the line-of-sight detecting unit 5 may be executed by the hardware circuitry.

The similar portion identifying unit 1 identifies a repetitive region in which a character string which is the same as or similar to the first encountered character string is repeatedly displayed. The repetitive region may be identified by determining whether or not a region including a predetermined element in a table structure, for example, in a document with a structure such as HTML is repeated. The predetermined element is not limited to a single element, but may be multiple elements. The repetitive region is an example of a similar portion.

The reading-time predicting unit 2 sets a predicted reading time for each region with respect to each of the repetitive region determined by the similar portion identifying unit 1 and a non-repetitive region (including both the basically non-repetitive region and the first encountered region of the repetitive regions) based on an amount of information of each region and distinguishing whether or not repetition of a character string is present.

The reference time measuring unit 3 measures a reference time for which a region included in the determination target document is referred to, for each region. For example, the reference time measuring unit 3 may set a time from a time point when a measurement target region is displayed on the output device 14 to a current time point, as the reference time. In addition, the reference time measuring unit 3 may set a time for which a line of sight is detected by the line-of-sight detecting device 16 and the measurement target region is gazed at, as the reference time. Further, the reference time measuring unit 3 may measure a time, for which the measurement target region is gazed at, with reference to a direction, a posture, or the like of a head, and set the time as the reference time.

The determination unit 4 determines whether or not the determination target document is read by a user. The determination unit 4 determines whether or not each region is read based on, for example, the predicted reading time and the reference time of each region included in the determination target document and may determine that the determination target document is read, for example, in a case where the regions are all read. In addition, the determination unit 4 may determine that the determination target document is read in a case where a ratio of the reference time to the predicted reading time for each region included in the determination target document is equal to or greater than a threshold value. Further, the determination unit 4 may determine that the determination target document is read in a case where a sum of the predicted reading time for each region included in the determination target document is shorter than a sum of the reference time of each region. The condition of determining that the determination target document is read is not limited to the illustrated condition.

The line-of-sight detecting unit 5 detects a user's line of sight and computes a line-of-sight position which is gazed at on the screen. The reference time measuring unit 3 measures a time for which the line-of-sight position is contained in the measurement target region as a reference time of the region.

The criteria table 6 defines a criterion according to each region in the determination target document. FIG. 5B illustrates an example of a configuration of the criteria table 6. In the example of FIG. 5B, the criteria table 6 includes elements of "repetitive region" and "non-repetitive region" as elements that identify a region. Here, the elements of "repetitive region" and "non-repetitive region" illustrated in the criteria table 6 of FIG. 5B are provided in an explanation column in terms of each region and are not used in the process of the determination unit 4. In addition, in the criteria table 6, criteria (attributes) are set for the elements represented by "repetitive region" and "non-repetitive region". In the example of FIG. 5B, a reading speed (characters/second) is set as an example of the criteria. For example, the first element in the criteria table 6 defines the criterion of the repetitive region, that is, the reading speed (characters/second) to be "20". In addition, the second element in the criteria table 6 defines the criterion of the non-repetitive region, that is, the reading speed (characters/second) to be "10". The criteria defined in FIG. 5B are a reading speed which is assumed when each region is read and the reading speed for the repetitive region is set to a speed faster than the reading speed for the non-repetitive region. This is because it is easier to understand details in the repetitive region than in the non-repetitive region and the reading speed for the repetitive region is usually faster than the reading speed for the non-repetitive region.

Example of Operation

FIGS. 6 to 10A illustrate a flowchart of a process of determining whether or not the document including the repetitive region is read.

Figure 6:
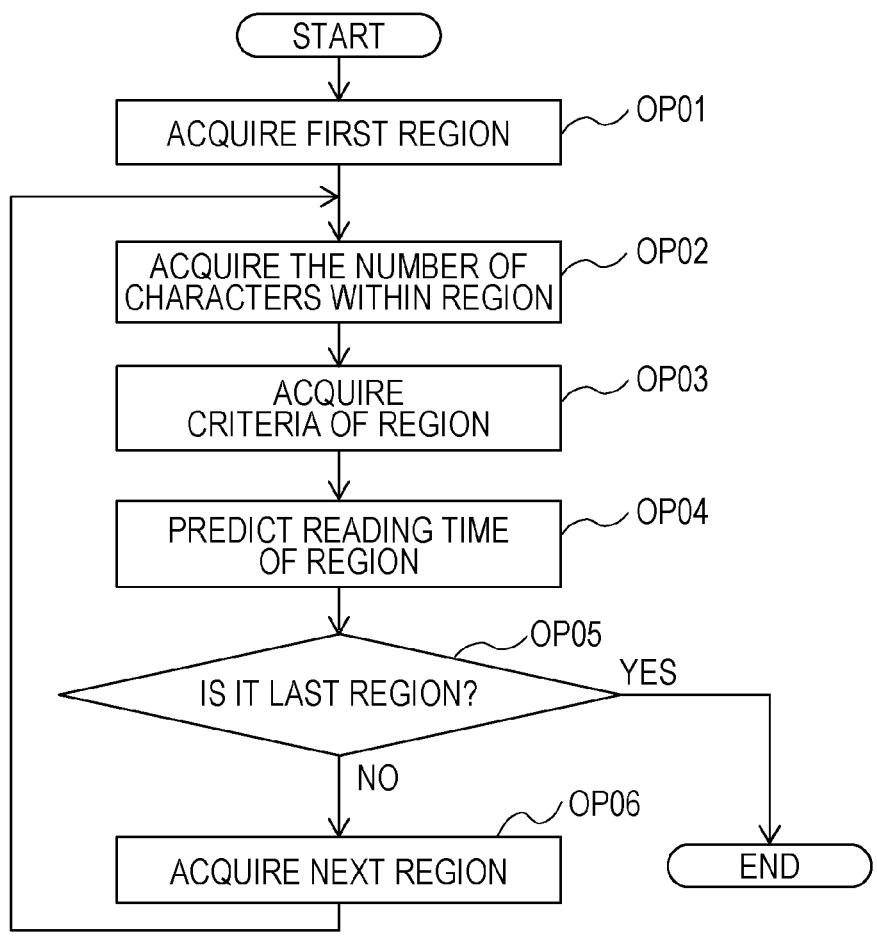
FIG. 6 illustrates an example of a flowchart of a process of predicting a reading time taken to read each region.
Figure 7:
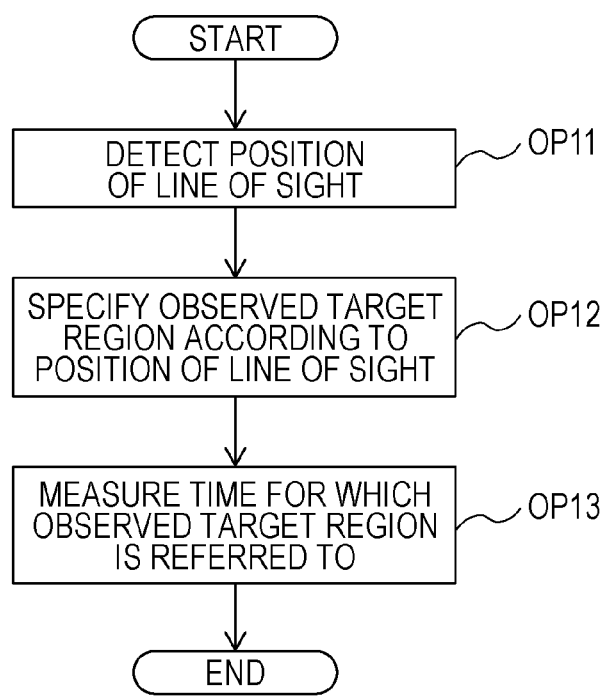
FIG. 7 illustrates an example of a flowchart of a process of measuring a reference time of a gazing target region.
Figure 8A:
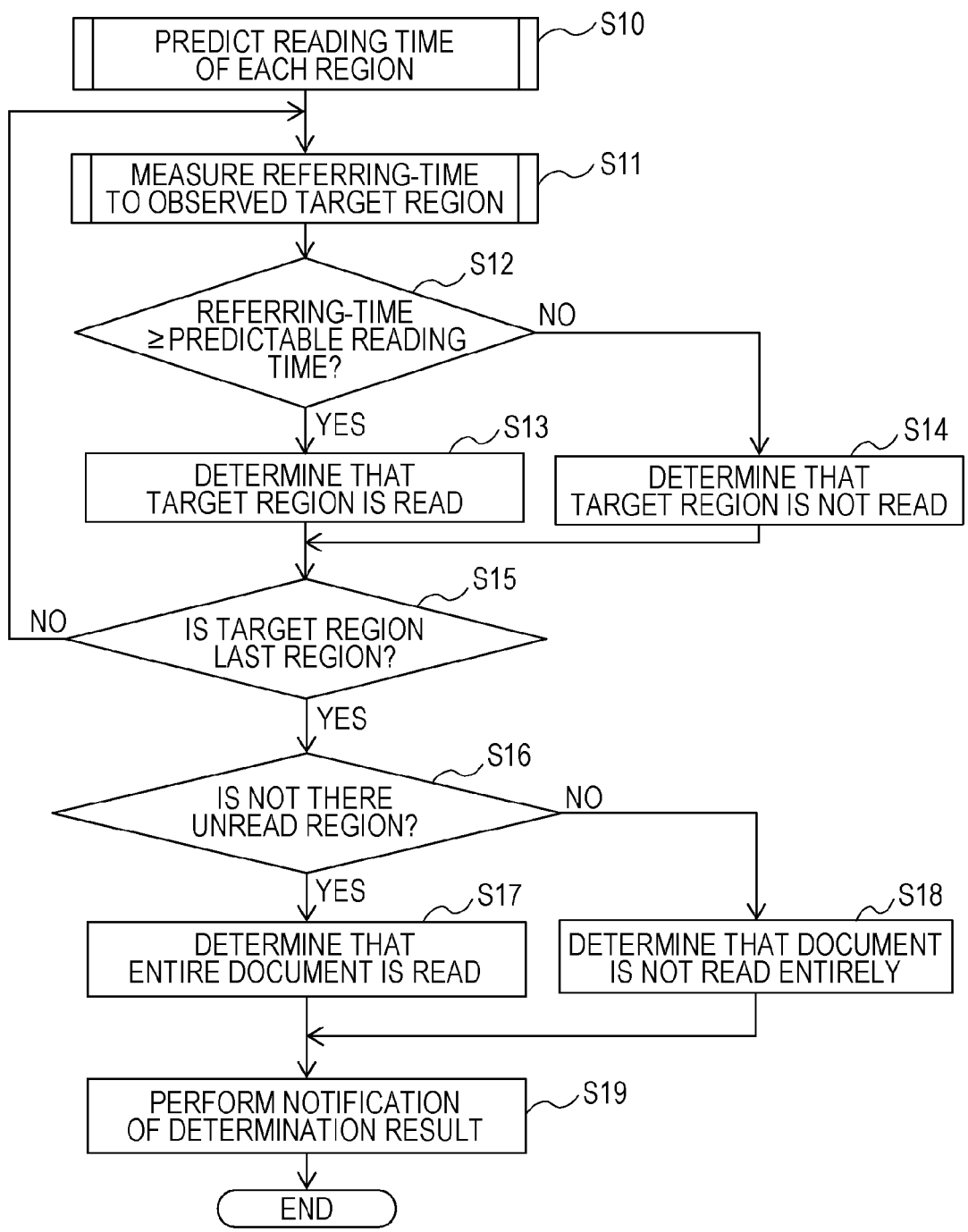
FIG. 8A illustrates an example of a flowchart of a process of determining the entire document as being read in a case where each region is read and of notifying a read determining result of the document.
Figure 8B:
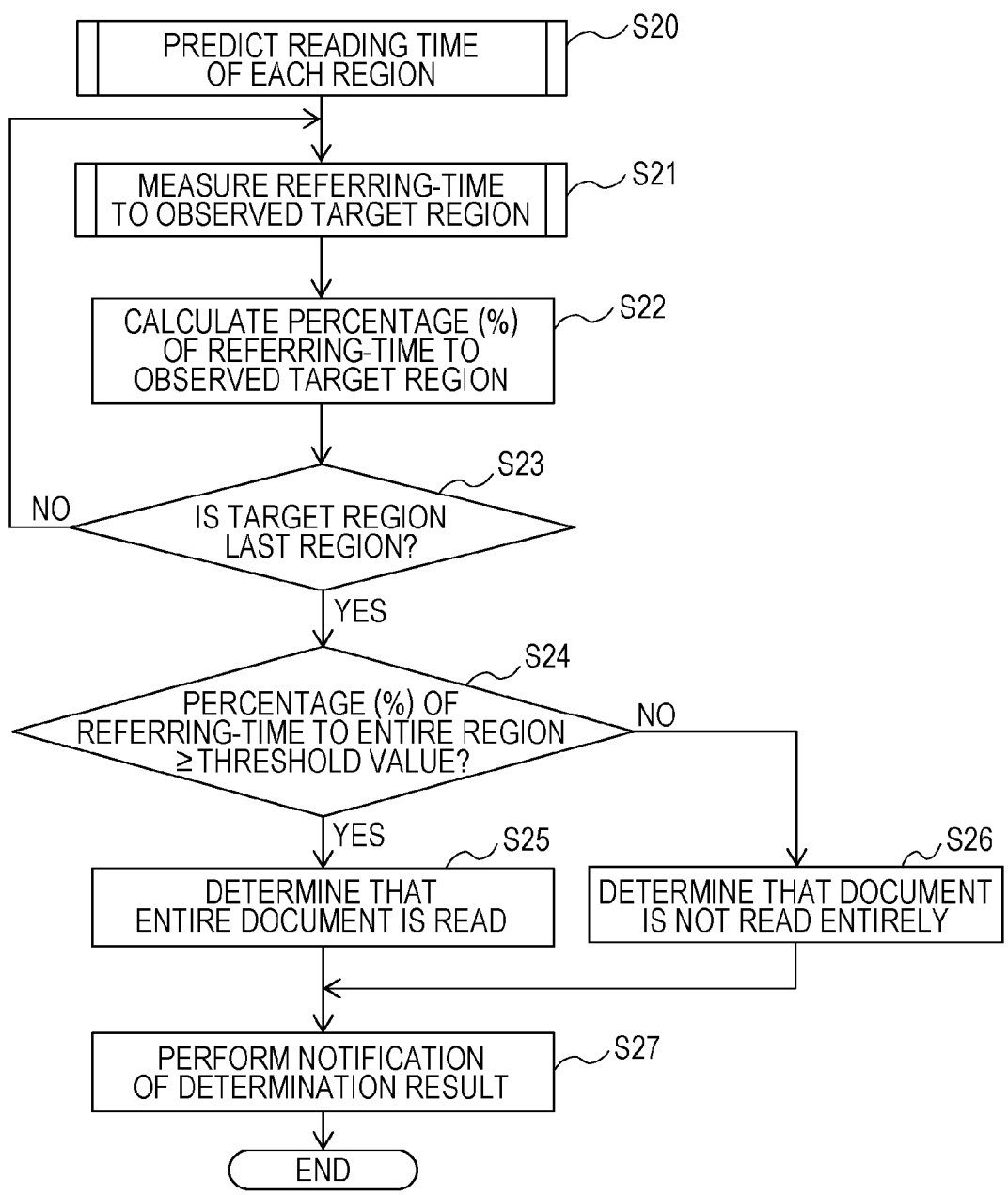
FIG. 8B illustrates an example of a flowchart of a process of determining the entire document as being read in a case where a ratio of the reference time to a predicted reading time for each region is equal to or greater than a threshold value and of notifying a read determining result of the document.
Figure 8C:
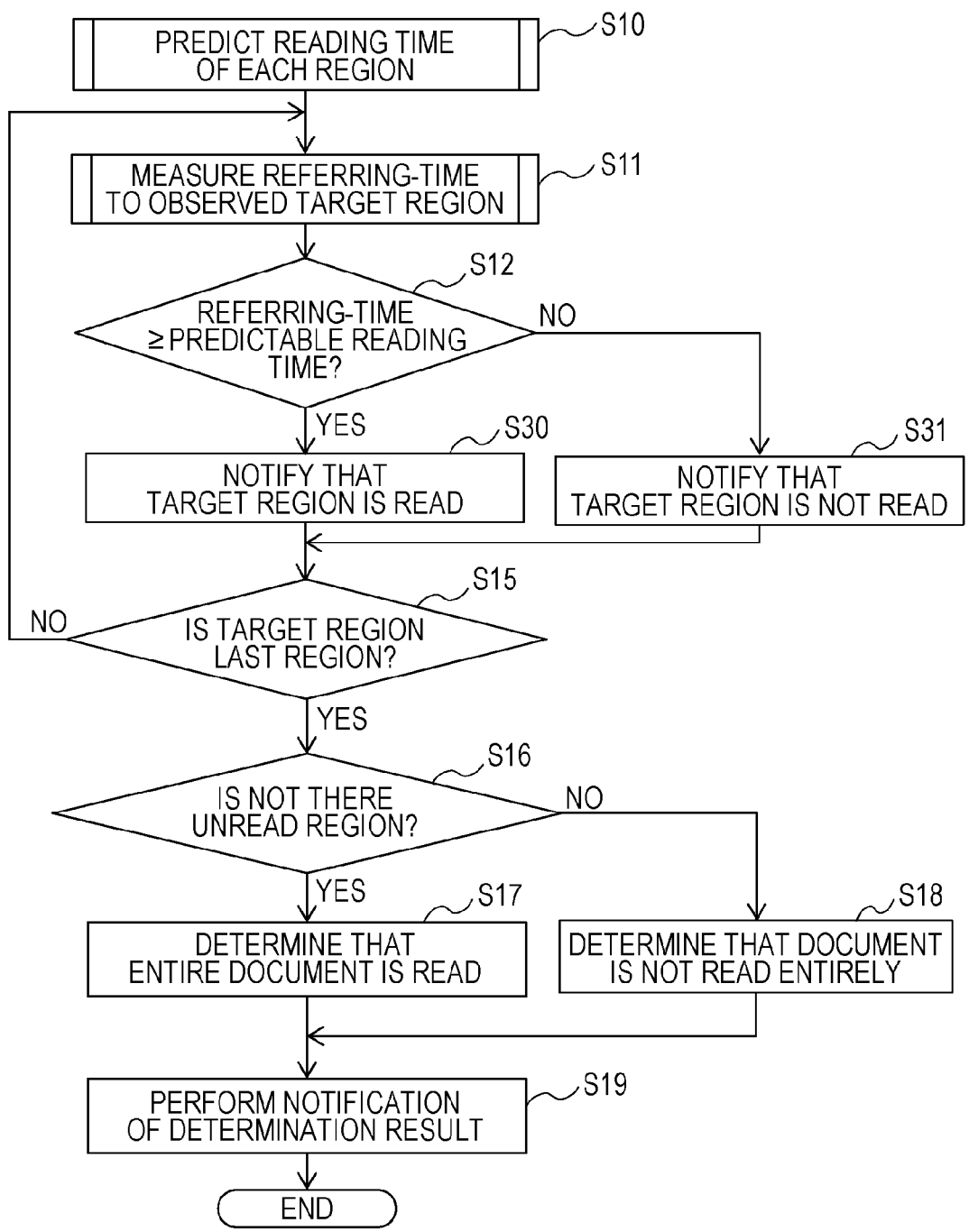
FIG. 8C illustrates an example of a flowchart of a process of determining the entire document as being read in a case where each region is read and of notifying a read determining result of each region and the entire document.
Figure 9:
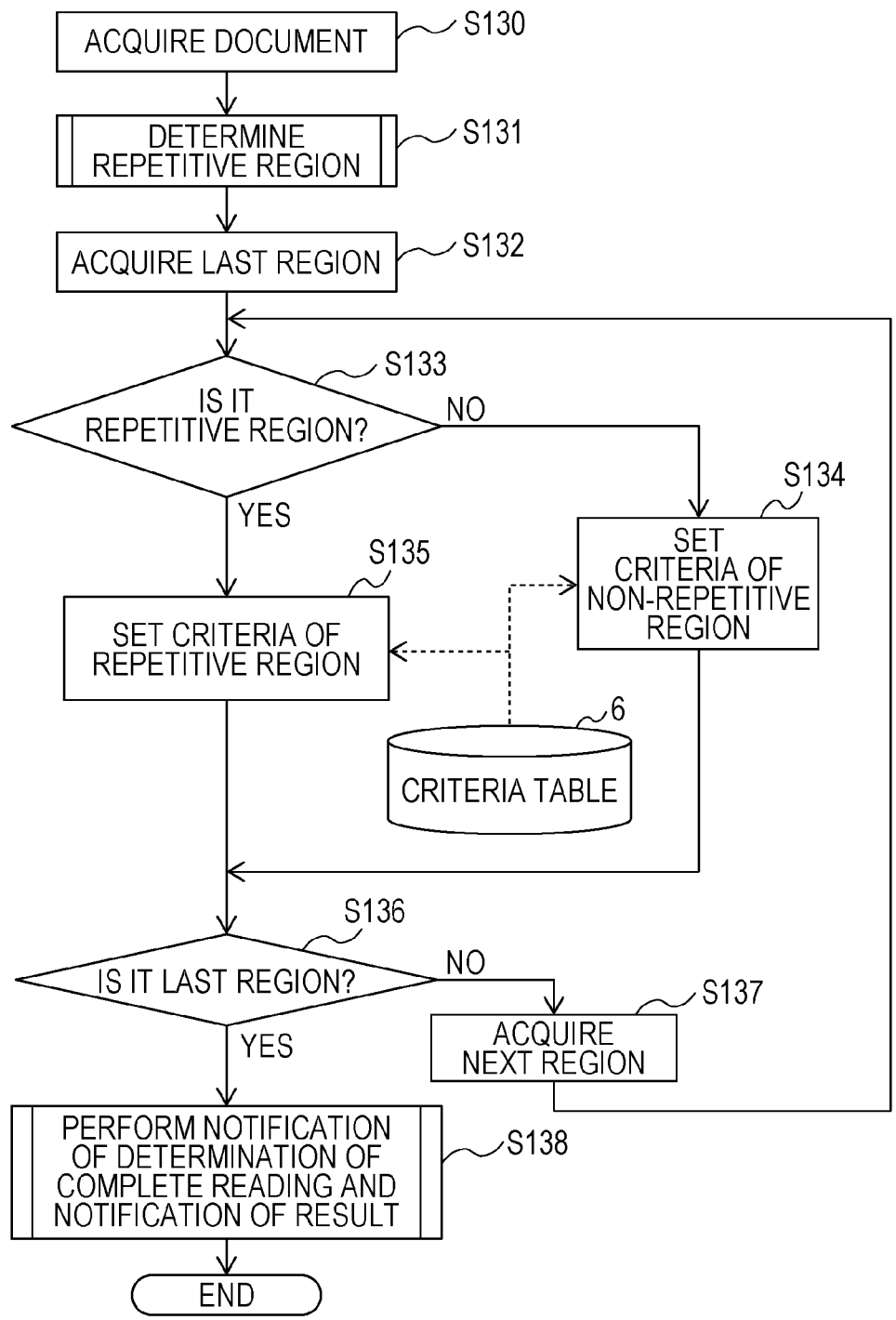
FIG. 9 illustrates an example of a flowchart of a process of determining whether or not the document including the repetitive region is read.

FIG. 6, FIG. 7, FIG. 8A, FIG. 8B, and FIG. 8C illustrate a flowchart of a process of determining a reading completion and notifying the result in S138 of FIG. 9. FIG. 6 illustrates a flowchart of a process which is common to the process of determining the reading completion and notifying the result in S138 and in which a reading time taken to read each region is predicted. FIG. 7 illustrates a flowchart of a process which is common to the process of determining the reading completion and notifying the result in S138 and in which a reference time of each region is measured. FIG. 10A illustrates a flowchart of a process of identifying the repetitive region in S131 of FIG. 9.

FIG. 9 illustrates an example of a flowchart of a process of determining whether or not the document including the repetitive region is read. The process in FIG. 9 starts, for example, when the determination target document is displayed on the output device 14.

In S130, the read determining device 10 acquires the determination target document and proceeds to the process in S131. In S131, the read determining device 10 identifies a repetitive region in the determination target document by the similar portion identifying unit 1 and proceeds to the process in S132. In S132, the read determining device 10 acquires the first region in the determination target document and proceeds to the process in S133. The read determining device 10 causes the determination unit 4 to perform processes from S133 to S138. In S133, the determination unit 4 determines whether or not the acquired region is the repetitive region; then, proceeds to the process in S135 in a case where the region is the repetitive region, and proceeds to the process in S134 in a case where the region is not the repetitive region. In S134, the determination unit 4 sets a criterion of the non-repetitive region to the acquired region. Specifically, the determination unit 4 refers to the criteria table 6 illustrated in FIG. 5B, sets the reading speed of 10 (characters/second) which is the criterion of the non-repetitive region to the acquired region, and proceeds to the process in S136. In S135, the determination unit 4 sets the criterion of the repetitive region to the acquired region. Specifically, the determination unit 4 refers to the criteria table 6 illustrated in FIG. 5B, sets the reading speed of 20 (characters/second) which is the criterion of the repetitive region to the acquired region, and proceeds to the process in S136. In S136, the determination unit 4 determines whether or not the acquired region is the last region in the document; then, proceeds to the process in S138 in a case where the acquired region is the last region and proceeds to the process in S137 in a case where the acquired region is not the last region. In S137, the determination unit 4 acquires the next region of the acquired region and returns to the process in S133. In S138, the determination unit 4 performs a determination that the determination target document is read, displays the determination result on the output device 14, and ends the process. The similar portion identifying unit 1 performs the process in S131 as an example of identifying the similar portion.

FIG. 6 illustrates an example of a flowchart of a process of predicting a reading time that is taken to read each region. The read determining device 10 causes the reading-time predicting unit 2 to predict the reading time that is taken to read each region. The process in FIG. 6 starts, for example, when the read determining device 10 proceeds to the process of determining the reading completion and notifying the result in S138 of FIG. 9.

In OP01, the reading-time predicting unit 2 acquires the first region of the read determination target document and proceeds to the process in OP02. In OP02, the reading-time predicting unit 2 acquires the number of characters in the acquired region and proceeds to the process in OP03. In OP03, the reading-time predicting unit 2 refers to the criteria table 6, acquires the criterion of the acquired region, and proceeds to the process in OP04. In OP04, the reading-time predicting unit 2 predicts a reading time that is taken to read the acquired region with reference to the number of characters in the region and the criterion. The reading-time predicting unit 2 may set a result obtained by dividing the number of characters in the region by the reading speed (characters/second) which is the criterion, as the predicted reading time. The reading-time predicting unit 2 proceeds to the process in OP05. In OP05, the reading-time predicting unit 2 determines whether or not the acquired region is the last region in the read determination target document; then, proceeds to the process in OP06 in a case where the acquired region is not the last region and ends the process in a case where the acquired region is the last region. The reading-time predicting unit 2 performs the processes from OP01 to OP06 as an example of setting the predicted reading time.

FIG. 7 illustrates an example of a flowchart of a process of measuring a reference time of a gazing target region. The process in FIG. 7 starts, for example, when the line-of-sight position detected by the line-of-sight detecting unit 5 is contained in an identified region in the determination target document.

In OP11, the read determining device 10 causes the line-of-sight detecting unit 5 to detect a user's line-of-sight position and proceeds to the process in OP12. In OP12, the line-of-sight detecting unit 5 identifies the region containing the line-of-sight position as a gazing target region at which the user gazes and proceeds to the process in OP13. In OP13, the read determining device 10 causes the reference time measuring unit 3 to measure a time for which the gazing target region is referred to and ends the process. The reference time measuring unit 3 executes the process in OP13 as an example of measuring the reference time.

FIG. 8A illustrates an example of a flowchart of a process of determining that the entire document is read in a case of determining that each region is read and of notifying a determination result of whether or not the document is read. The process in FIG. 8A is an example of the process in S138 of FIG. 9.

In S10, the read determining device 10 causes the reading-time predicting unit 2 to predict a reading time that is taken to read each region and proceeds to the process in S11. The process in S10 corresponds to the process of predicting the reading time taken to read each region in FIG. 6.

In S11, the read determining device 10 causes the reference time measuring unit 3 to measure the reference time of the gazing target region and proceeds to the process in S12. The process in S11 corresponds to the process of measuring the reference time of the gazing target region in FIG. 7. The measurement of the reference time is not limited to the measurement through detecting the line of sight. For example, the reference time measuring unit 3 may measure a time for which the gazing target region is displayed on the output device 14 as the reference time.

The read determining device 10 causes the determination unit 4 to execute the processes from S12 to S19. In S12, the determination unit 4 determines whether or not the reference time of the gazing target region is equal to or longer than the predicted reading time for the region; then, proceeds to the process in S13 in a case where the reference time is equal to or longer than the predicted reading time for the region, and proceeds to the process in S14 in a case where the reference time is shorter than the predicted reading time for the region.

In S13, the determination unit 4 determines that the gazing target region is read and proceeds to the process in S15. In S14, the determination unit 4 determines that the gazing target region is not read and proceeds to the process in S15. In S15, the determination unit 4 determines whether or not the gazing target region is the last region in the determination target document; then, proceeds to the process in S16 in a case where the gazing target region is the last region and returns to the process in S11 in a case where the gazing target region is not the last region. Here, when determining whether or not the gazing target region is the last region, the current gazing target region may be determined to be the last region, for example, when there is no region in the determination target document, for which the reference time is not measured.

In S16, the determination unit 4 determines whether or not there is an unread region in the determination target document; then, proceeds to the process in S17 in a case where there is no unread region, and proceeds to the process in S18 in a case where there is an unread region. In S17, the determination unit 4 determines that the determination target document is read and proceeds to the process in S19. In S18, the determination unit 4 determines that the read determination target document is not read and proceeds to the process in S19. In S19, the determination unit 4 notifies the user of the determination result of whether or not the document is read and ends the process. The determination result may be notified to the user, for example, by being displayed on the output device 14. The determination unit 4 executes the processes from S12 to S19 as an example of determining whether or not the document is read.

FIG. 8B illustrates an example of a flowchart of a process of determining that the entire document is read in a case where a ratio of the reference time to the predicted reading time for each region is equal to or greater than the threshold value and of notifying the determination result of whether or not the document is read. The process in FIG. 8B is an example of the process in S138 of FIG. 9.

Since the processes in S20 and S21 are the same processes in S10 and S11 of FIG. 8A, respectively, the description thereof is omitted. The read determining device 10 causes the determination unit 4 to execute the processes from S22 to S27. In S22, the determination unit 4 calculates a ratio of the reference time of the gazing target region to the predicted reading time for the gazing target region and proceeds to the process in S23. Since the process in S23 is the same process in S15 of FIG. 8A, the description thereof is omitted. The determination unit 4 proceeds to the process in S24. In S24, the determination unit 4 determines whether or not the ratio of the reference time of each region to the predicted reading time which is calculated in S22 is equal to or greater than the threshold value in any one of the regions; then, proceeds to the process in S25 in a case where the ratio is equal to or greater than the threshold value, and proceeds to the process in S26 in a case where the ratio is less than the threshold value. Since the processes in S25, S26, and S27 are the same processes in S17, S18, and S19 of FIG. 8A, respectively, the description thereof is omitted. The determination unit 4 executes the processes from S22 to S27 as an example of determining whether or not the document is read.

FIG. 8C illustrates an example of a flowchart of a process of determining that the entire document is read in a case of determining that each region is read by a user and of notifying the determination result of each region and the entire document. The same reference number is attached to the same process as that in FIG. 8A and the description thereof is omitted.

In S30, the determination unit 4 determines that the gazing target region is read, at which the user gazes, and notifies the user of the determination result. For example, the determination unit 4 may set a background color that is different from the unread region in the gazing target region and thereby, may perform the notification. In S31, the determination unit 4 notifies the user that the gazing target region is not read, at which the user gazes. For example, the determination unit 4 may set a background color that is different from the read region in the gazing target region and thereby, may perform the notification. The determination unit 4 executes the processes in S12, S30, S31, and from S15 to S19 as an example of determining whether or not the document is read.

FIG. 10A illustrates an example of a flowchart of a process of identifying the repetitive region in S131 of FIG. 9. In FIG. 10A, the read determining device 10 analyzes an HTML source code which defines the table illustrated in FIG. 3 and thereby, the repetitive region in the document in FIG. 3 is identified.

FIG. 10B illustrates an example of the HTML source code which defines the table illustrated in FIG. 3. In FIG. 10B, the first line and the last line are provided with a <html> tag and </html> which indicate a start portion and an end portion in an HTML document, respectively. The second line and the second line from the bottom are provided with a <body> tag and </body> which indicate a start portion and an end portion of a body in the document, respectively. The third line is provided with characters of "product searching result" as details of the body. The fourth line and the third line from the bottom are provided with a <table> tag and </table> which indicate a start portion and an end portion of a table definition, respectively. Each line from the fifth line to the eight line is provided with a portion enclosed by a <tr> tag and a </tr> tag which define a line. In the portion enclosed by the <tr> tag and the </tr> tag, three cells, each of which is enclosed by a <td> tag and a </td> tag, are defined for each line. The first cell in each line is provided with a character string of "purchase". The second cell in each line is provided with a name and price of a product corresponding to each line. The third cell in each line defines an image file of a product corresponding to each line so as to be provided in the cell.

FIG. 10A illustrates an example of a flowchart of a process of identifying the repetitive region in the document in FIG. 3. The process in FIG. 10A starts, for example, when the read determining device 10 proceeds to the process of identifying the repetitive region in S131 of FIG. 9. The read determining device 10 causes the similar portion identifying unit 1 to execute the processes from OP21 to OP28.

In OP21, the similar portion identifying unit 1 acquires a definition portion of the table enclosed by the <table> tag and the </table> in FIG. 10B and proceeds to the process in OP22. In OP22, the similar portion identifying unit 1 divides the table acquired in OP21 into the lines enclosed by the <tr> tag and the </tr> tag and proceeds to the process in OP23. In OP23, the similar portion identifying unit 1 acquires the first line of the lines divided in OP22, acquires a character string of the first cell enclosed by the first <td> tag and the </td> tag, and proceeds to the process in OP24. In OP24, the similar portion identifying unit 1 adds the acquired character string to the first encountered list and proceeds to the process in OP28. Here, the first encountered list may be stored temporarily in the main storage device 12 or may be stored in the auxiliary storage device 15 using a database or the like. In the example of the HTML source code illustrated in FIG. 10B, the character string of ["purchase"] is added to the first encountered list. In OP28, the similar portion identifying unit 1 determines whether or not the current line is the last line of the lines divided in OP22; then, ends the process in a case where the current line is the last line and proceeds to the process in OP27 in a case where the current line is not the last line. In OP27, the similar portion identifying unit 1 acquires a character string of the first cell of the next line and proceeds to the process in OP25. In OP25, the similar portion identifying unit 1 determines whether or not the character string acquired in OP27 is present in the first encountered list; then, proceeds to the process in OP26 in a case where the acquired character string is present and returns to the process in OP24 in a case where the acquired character string is not present. In OP26, the similar portion identifying unit 1 sets the region including the acquired character string as the repetitive region and proceeds to the process in OP28. The similar portion identifying unit 1 ends the process in a case where it is determined that the current line is the last line in OP28. The similar portion identifying unit 1 executes the processes from OP21 to OP28 as an example of identifying the similar portion.

The process in FIG. 10A illustrates an example in which first cells of the lines, that is, character strings of the first column are acquired so as to be compared to each other and thereby, a repetitive region is identified; however, the character string as the comparison target is not limited to the character string of the first column. The similar portion identifying unit 1 acquires character strings from multiple columns in random so as to generate the first encountered list and thereby, may identify a repetitive region. In addition, the identified region may be a rectangle which is partitioned by cells or may be a region which surrounds the periphery of the character strings in the cell such that a predetermined distance from the character string is kept. In this way, a range of the region that is narrower than the rectangle which is partitioned by cells is identified and thereby, the reference time measuring unit 3 may measure the reference time with high accuracy.

According to Example 1, since the read determining device 10 sets a reading speed for the repetitive region which is faster than that for the non-repetitive region, as the criterion, the predicted reading time for the repetitive region is set to be shorter than the predicted reading time for the non-repetitive region. Accordingly, it is possible to avoid a case where the read determining device 10 counts the number of characters in the document such that even the number of characters in a portion is added, into which a close look is not desired, a time, for which the document is read, is determined depending on the number of characters, and thus, it is determined that the region is not an already-read region if the time depending on the number of relevant characters is not displayed. That is, it is possible to reduce an occurrence of an incorrect determination when determining whether or not the determination target is read.

Modification Example 1

According to Modification Example 1 of Example 1, the determination target document processed by the read determining device 10 is assumed to be a document in which a region including a combination of multiple character strings is repeatedly displayed. The combination of the multiple character strings included in the repetitive region may be repeated in a state in which the order is reversed. That is, Modification Example 1 of Example 1 illustrates an example in which, when the combinations of the multiple character strings included in the repetitive regions are matched to each other, the regions are identified as the similar region and the predicted reading time is set to be short. In a case where the combinations of the multiple character strings included in the repetitive regions are matched to each other, it is easy to understand details even when the order of the character strings is reversed and it is possible to read the similar region faster than the dissimilar region. Thus, the read determining device 10 sets a reading speed that is faster than that for the dissimilar region to the similar region, as the criterion. Accordingly, the reading time taken to read the similar region which is predicted based on the criterion and the amount of information is shorter than the predicted reading time for the dissimilar region and the threshold value of the predicted reading time for determining that the document is read is lowered.

FIG. 11 illustrates an example of the determination target document according to Modification Example 1 of Example 1. FIG. 11 illustrates an example in which a document including a similar region is divided. In FIG. 11, as a list of products, a rice cooker, a television, and a bicycle are illustrated. On the upper part of the document, a character string of "rice cooker" as a product name is illustrated. Below the character string of "rice cooker", a table having two columns is illustrated. In the first line of the first column, a character string of "maker" is illustrated, in the second line of the first column, a character string of "price" is illustrated, and in the third line of the first column, a character string of "condition" is illustrated, as titles of items. In the first line of the second column, a character string of "A company" as the maker of the rice cooker is illustrated, in the second line of the second column, a character string of "12,000 Yen" as the price is illustrated, and in the third line of the second column, a character string of "new" as the condition is illustrated. On the middle part of the document, a character string of "television" as a product name is illustrated. Below the character string of "television", a table having two columns is illustrated. In the first line of the first column, a character string of "maker" is illustrated, in the second line of the first column, a character string of "condition" is illustrated, and in the third line of the first column, a character string of "price" is illustrated, as titles of items. In the first line of the second column, a character string of "B company" as the maker of the television is illustrated, in the second line of the second column, a character string of "used" as the condition is illustrated, and in the third line of the second column, a character string of "2,000 Yen" as the price is illustrated. On the lower part of the document, a character string of "bicycle" as a product name is illustrated. Below the character string of "bicycle", a table having two columns is illustrated. In the first line of the first column, a character string of "maker" is illustrated, in the second line of the first column, a character string of "condition" is illustrated, and in the third line of the first column a character string of "price" is illustrated, as titles of items. In the first line of the second column, a character string of "X company" as the maker of the bicycle is illustrated, in the second line of the second column, a character string of "broken down" as the condition is illustrated, and in the third line of the second column, a character string of "free" as the price is illustrated.

In FIG. 11, in the first column of the table of each product, the character strings of "maker", "price", and "condition" as the titles of the items are illustrated. Here, in the first column of the table corresponding to the rice cooker, the titles of the items are illustrated in the order of "maker", "price", and "condition" from the top; however, in the tables corresponding to the television and the bicycle, the titles of the items are illustrated in the order of "maker", "condition", and "price" from the top. Thus, the order is different from a case of the rice cooker. However, when the combination of the titles of the items in the first column of the table corresponding to the rice cooker is the same as the combination of the titles of the items in the first column of the table corresponding to the television or the bicycle. The read determining device 10 identifies a region including the combination of the titles of the items in the first column of the table corresponding to the television or the bicycle as the similar region. The similar region is an example of a similar portion. The dissimilar region is an example of the dissimilar portion. According to Modification Example 1 of Example 1, since the hardware configuration and the process block are the same as in Example 1, the description thereof is omitted.

Example of Operation

Figure 12A:
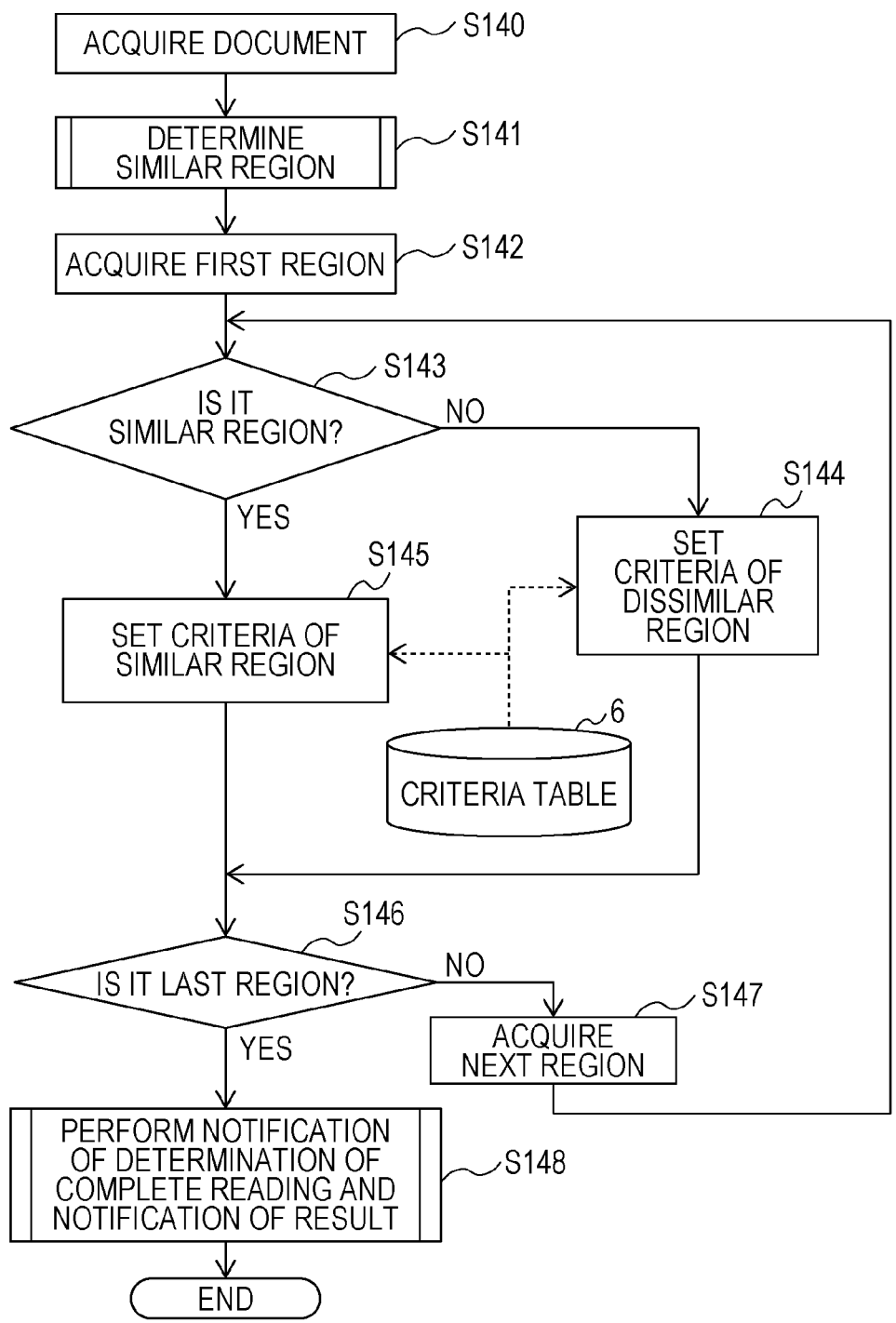
FIG. 12A illustrates an example of a flowchart of a process of determining whether or not the document including the similar region is read.

FIG. 12A illustrates an example of a flowchart of a process of determining whether or not the document including the similar region is read. The process in FIG. 12A starts, for example, when the determination target document is displayed on the output device 14.

In S140, the read determining device 10 acquires the determination target document and proceeds to the process in S141. In S141, the read determining device 10 causes the similar portion identifying unit 1 to identify the similar region in the determination target document and proceeds to the process in S142.

The read determining device 10 causes the determination unit 4 to execute the processes from S142 to S148. In S142, the determination unit 4 acquires the first region in the determination target document and proceeds to the process in S143. In S143, the determination unit 4 determines whether or not the acquired region is the similar region; then, proceeds to the process in S145 in a case where the region is the similar region and proceeds to the process in S144 in a case where the region is not the similar region. In S144, the determination unit 4 sets a criterion of the dissimilar region to the acquired region. Specifically, the determination unit 4 refers to the criteria table 6 illustrated in FIG. 12B, sets the reading speed of 10 (characters/second) which is the criterion of the similar region to the acquired region, and proceeds to the process in S146. In S145, the determination unit 4 sets the criterion of the similar region to the acquired region. Specifically, the determination unit 4 refers to the criteria table 6 illustrated in FIG. 12B, sets the reading speed of 20 (characters/second) which is the criterion of the dissimilar region to the acquired region, and proceeds to the process in S146. The elements of "similar region" and "dissimilar region" illustrated in the criteria table 6 of FIG. 12B are provided in an explanation column in terms of each region and are not used in the process of the determination unit 4. In S146, the determination unit 4 determines whether or not the acquired region is the last region in the document; then, proceeds to the process in S148 in a case where the acquired region is the last region and proceeds to the process in S147 in a case where the acquired region is not the last region. In S147, the determination unit 4 acquires the next region of the acquired region and returns to the process in S143. In S148, the determination unit 4 performs determining that the determination target document is read, displays the determination result on the output device 14, and ends the process. The process in S148 is illustrated by the processes from FIG. 8A to FIG. 8C described according to Example 1. The similar portion identifying unit 1 performs the process in S141 as an example of identifying the similar portion.

Figure 13A:
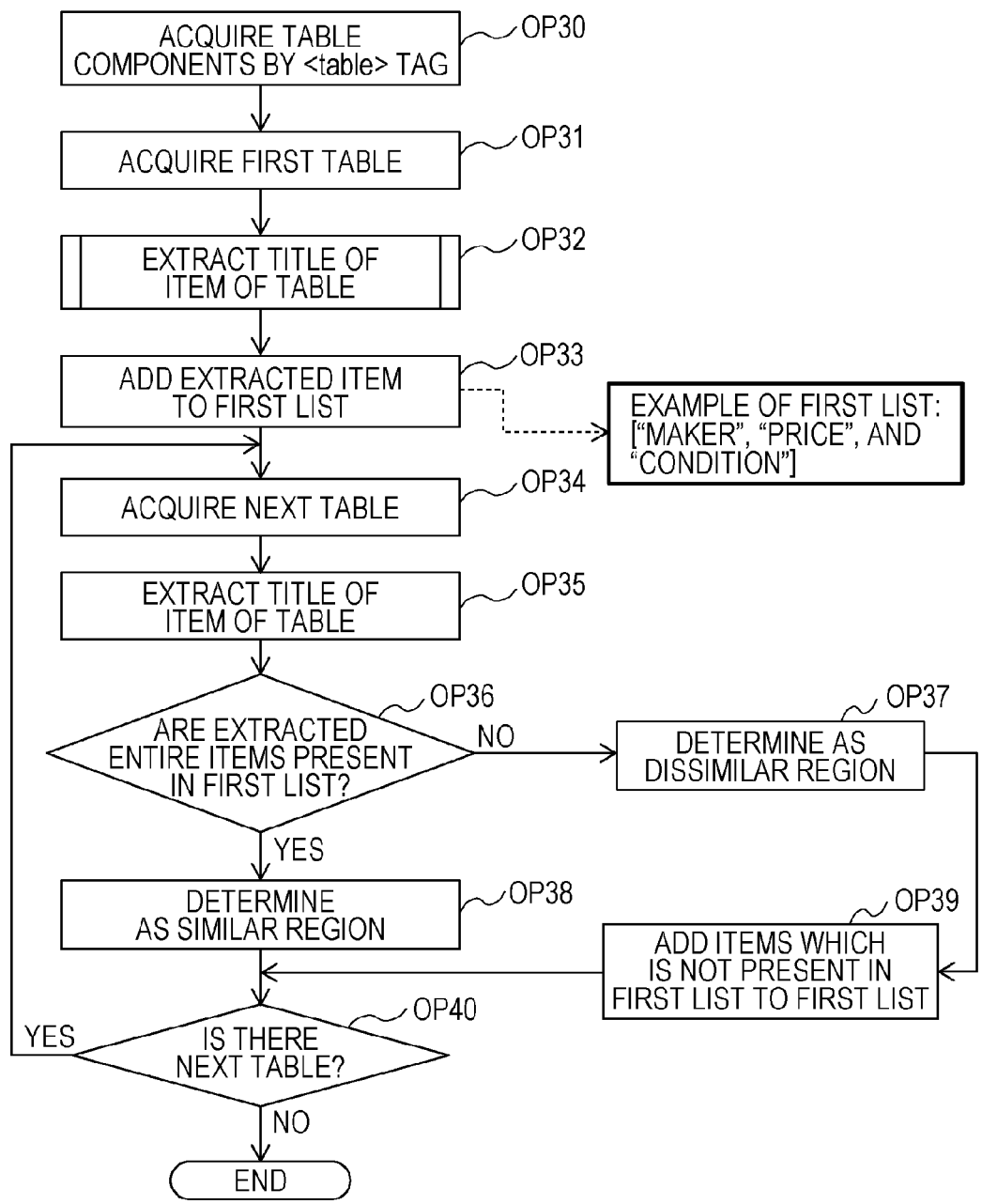
FIG. 13A illustrates an example of a flowchart of a process of identifying the similar region in the document in FIG. 11.
Figure 13B:
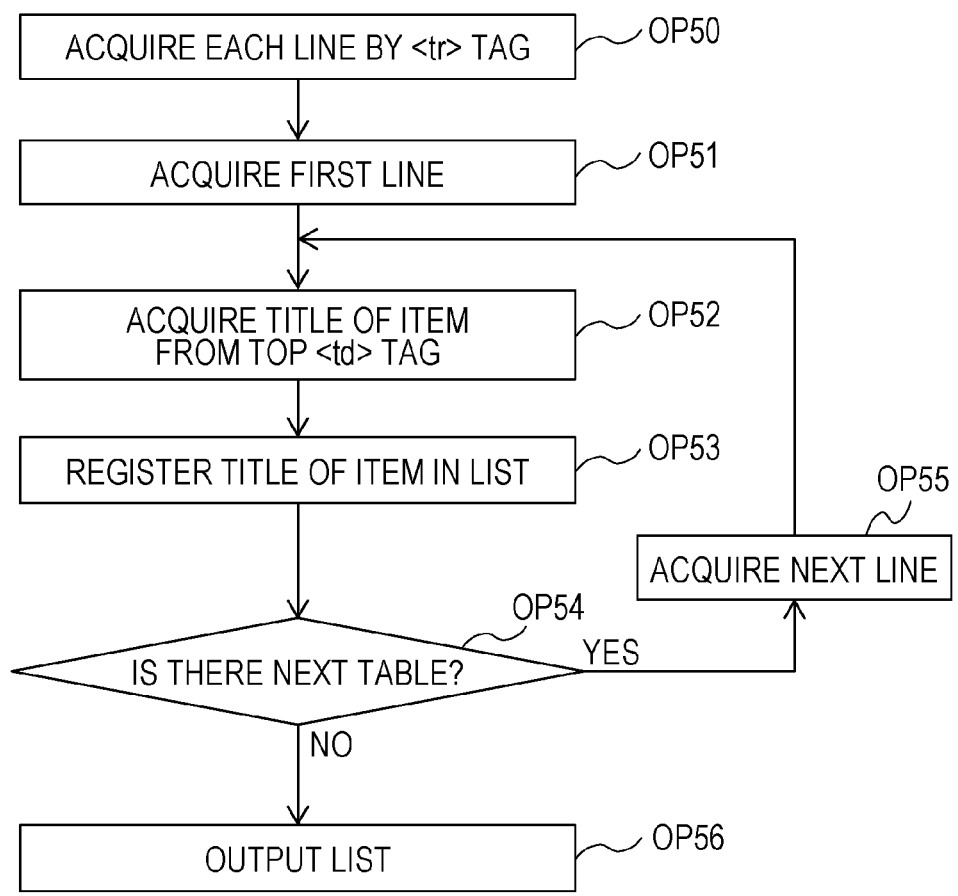
FIG. 13B illustrates an example of a flowchart of a process of extracting an item in a table of the document in FIG. 11.

FIG. 13A to FIG. 13C illustrate a process of identifying the similar region in S141 of FIG. 12A. FIG. 13A illustrates a flowchart of a process of identifying the similar region in S141 of FIG. 12A. In FIG. 13A, the similar portion identifying unit 1 analyzes an HTML source code which defines the table illustrated in FIG. 11 and thereby, the similar region in the document in FIG. 11 is identified. FIG. 13B illustrates a flowchart of a process of extracting an item in the table in OP32 of FIG. 13A.

FIG. 13C illustrates an example of an HTML source code which defines the table illustrated in FIG. 11. In FIG. 13C, the first line and the last line are provided with a <html> tag and </html> which indicate a start portion and an end portion in an HTML document, respectively. The second line and the second line from the bottom are provided with a <body> tag and </body> which indicate a start portion and an end portion of a body in the document, respectively. Following the character string of "rice cooker" in the fourth line, the fifth line and the ninth line are provided with a <table> tag and </table> which indicate a start portion and an end portion of table definition, respectively. Each line from the sixth line to the eight line is provided with a portion enclosed by a <tr> tag and a </tr> tag which define a line. In the portion enclosed by the <tr> tag and the </tr> tag, two cells, each of which is enclosed by a <td> tag and a </td> tag, are defined for each line. The first cell in each line is provided with character strings of "maker", "price", and "condition" as the title of the items in the order from the top. The second cell in each line is provided with an attribute corresponding to the title of the items in each line. Following the table corresponding to the rice cooker, tables corresponding to the television and the bicycle are defined. The first cells in the lines of the tables corresponding to the television and the bicycle have an order different from the order in a case of the rice cooker and the character strings of "maker", "condition", and "price" are displayed as the title of the items in the order from the top.

FIG. 13A illustrates an example of a flowchart of a process of identifying the similar region in the document in FIG. 11. The process in FIG. 13A starts, for example, when the read determining device 10 proceeds to the process of identifying the similar region in S141 of FIG. 12A. The read determining device 10 causes the similar portion identifying unit 1 to execute the processes from OP30 to OP40.

In OP30, the similar portion identifying unit 1 acquires table elements enclosed by the <table> tag and the </table> and proceeds to the process in OP31. In OP31, the similar portion identifying unit 1 acquires the first table from the definition portion of the table enclosed by the first <table> tag and the </table> in FIG. 13C and proceeds to the process in OP32. In OP32, the similar portion identifying unit 1 extracts an item displayed in the first column of the acquired table and proceeds to the process in OP33. In OP33, the similar portion identifying unit 1 adds the item extracted in OP32 to the first encountered list and proceeds to the process in OP34. Here, the first encountered list may be stored temporarily in the main storage device 12 or may be stored in the auxiliary storage device 15 using a database or the like. In the example of the HTML source code illustrated in FIG. 13C, a combination of three character strings of ["maker", "price", and "condition"] is added to the first encountered list. In OP34, the similar portion identifying unit 1 acquires the next table from the definition portion of the table enclosed by the next <table> tag and the </table> and proceeds to the process in OP35. In OP35, the similar portion identifying unit 1 extracts the first title of the item enclosed by the first <td> tag and </td> tag in the definition portion of each line enclosed by the <tr> tag and </tr> tag of the acquired table and proceeds to the process in OP36. In OP36, the similar portion identifying unit 1 determines whether or not the multiple extracted titles of the items are matched with the combination of the multiple character strings added to the first encountered list; then, proceeds to the process in OP38 in a case of matching and proceeds to the process in OP37 in a case of not matching. In OP37, the similar portion identifying unit 1 identifies a region including the extracted titles of the items as a dissimilar region and proceeds to the process in OP39. In OP39, the similar portion identifying unit 1 adds an item which is not present in the first encountered list, of the items in the dissimilar region identified in OP37 to the first encountered list and proceeds to the process in OP40. In OP38, the similar portion identifying unit 1 identifies a region including the extracted titles of the items as a similar region and proceeds to the process in OP40. In OP40, the similar portion identifying unit 1 determines whether or not the next table is present; then, returns to the process in OP34 in a case where the next table is present and ends the process in a case where the next table is not present. The similar portion identifying unit 1 executes the processes from OP30 to OP40 as an example of identifying the similar portion.

The process in FIG. 13A illustrates an example in which the titles of the items displayed in the first column of the lines are extracted so as to be compared to each other and thereby, the similar region is identified; however, the character string as the comparison target is not limited to the character string of the first column. The similar portion identifying unit 1 acquires character strings of multiple columns in random so as to generate the first encountered list and thereby, may identify a similar region. In addition, the identified region may be a rectangle which is partitioned by multiple cells or may be a region which surrounds the periphery of the combination of the multiple character strings such that a predetermined distance from the character string is kept. In this way, a range of the region that is narrower than the rectangle which includes the character strings is identified and thereby, it is possible for the reference time measuring unit 3 to measure the reference time with high accuracy.

FIG. 13B illustrates an example of a flowchart of a process of extracting an item in a table of the document in FIG. 11. The process in FIG. 13B starts, for example, when the similar portion identifying unit 1 proceeds to the process of extracting an item of a table in OP32 of FIG. 13A.

In OP50, the similar portion identifying unit 1 acquires the lines enclosed by the <tr> tag and </tr> tag of the acquired table and proceeds to the process in OP51. In OP51, the similar portion identifying unit 1 acquires the first line of the lines acquired in OP50 and proceeds to the process in OP52. In OP52, the similar portion identifying unit 1 acquires the title of the item in the first column enclosed by the first <td> tag and </td> tag of the acquired lines and proceeds to the process in OP53. In OP53, the similar portion identifying unit 1 registers the acquired title of the item into the list and proceeds to the process in OP54. The list may be stored temporarily in the main storage device 12 or may be stored in the auxiliary storage device 15 using a database or the like. In OP54, the similar portion identifying unit 1 determines whether or not the next line is present in the lines acquired in OP50; then, proceeds to the process in OP55 in a case where the next line is present and proceeds to the process in OP56 in a case where the next line is not present. In OP55, the similar portion identifying unit 1 acquires the next line in the lines acquired in OP50 and returns to the process in OP52. In OP56, the similar portion identifying unit 1 outputs a list of the titles of the items registered in OP53 and ends the process. The output list is added to the first encountered list in the process of OP33 of FIG. 13A.

According to Modification Example 1 of Example 1, the read determining device 10 identifies a region to a similar region in a case where a combination of the multiple character strings included in the regions in the document is matched with a combination of the multiple character strings included in another region regardless of the order. Since the read determining device 10 sets a reading speed for the similar region which is faster than that for the dissimilar region, as the criterion, the predicted reading time for the similar region is set to be shorter than the predicted reading time for the dissimilar region. Accordingly, it is possible to avoid a case where the read determining device 10 counts the number of characters in the document such that even the number of characters in a region is added, into which a close look is not desired, a time, for which the document is read, is determined depending on the number of characters, and thus, the region is not determined as the read region if the time depending on the number of relevant characters is not displayed. That is, it is possible to determine whether or not the determination target is read, with accuracy.

Modification Example 2

According to Modification Example 2 of Example 1, the determination target document processed by the read determining device 10 is assumed to be a document image obtained by digitizing a paper document using a scanner or the like. Unlike the Example 1 and the Modification Example 1 of the Example 1, the document image does not have a document structure such as HTML. However, in the document image, it is possible to read the repetitive region or the similar region faster than the non-repetitive region or the dissimilar region in a case of including the repetitive region and the similar region. As a method of identifying the repetitive region and the similar region, a technique of dividing the document image into regions of a sentence, a picture, or the like or a technique of detecting the similar region is known (for example, see Japanese Laid-open Patent Publication Nos. 9-91450 and 10-162020). The read determining device 10 identifies the similar region included in the document image using these techniques and may set a reading speed for the similar region which is faster than that of the dissimilar region, as a criterion. Accordingly, the reading time taken to read the similar region which is predicted based on the criterion and an amount of information becomes shorter than the predicted reading time for the dissimilar region and a threshold value of the predicted reading time is lowered, which is used for determining that the document is read.

FIG. 14 illustrates an example of the determination target document according to Modification Example 2 of Example 1. FIG. 14 illustrates an example of the document including the similar region. In FIG. 14, four displays are displayed as goods in the order from the top. An image of each display is displayed in the right-hand end. Titles of the items of "product name", "specification", and "price" for each display are displayed in the order from the top in the left-hand end. The corresponding attributes of the display is displayed on the right side of each title of the item. The read determining device 10 identifies the region including the titles of the items of "product name", "specification", and "price" as the similar region using the above techniques. Since the hardware configuration and the process block according to Modification Example 2 of Example 1 are the same as in Example 1, the description thereof is omitted.

Example of Operation

Figure 15:
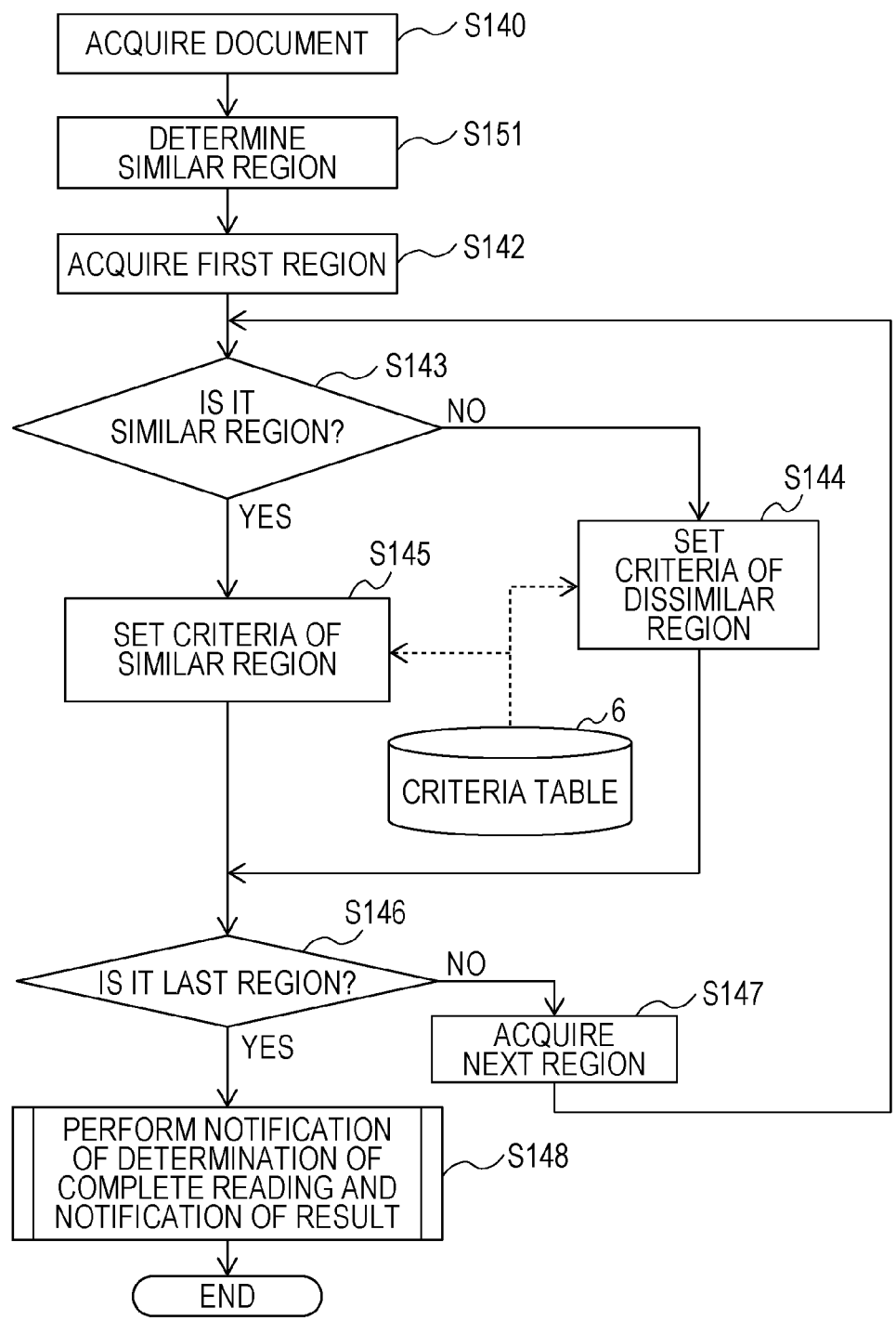
FIG. 15 illustrates an example of a flowchart of a process of determining whether or not the document including the similar region is read.

FIG. 15 illustrates an example of a flowchart of a process of determining whether or not the document including the similar region is read. The same reference number is attached to the same process as that in FIG. 12A and the description thereof is omitted.

In S151, the read determining device 10 causes the similar portion identifying unit 1 to identify the similar region in the determination target document. Here, the similar portion identifying unit 1 identifies the similar region in the determination target document using the technique of dividing the document image into regions of a sentence, a picture, or the like or the technique of detecting the similar region. Next, the read determining device 10 proceeds to the process in S142. The processes from S142 to the end are the same as in FIG. 12A.

According to Modification Example 2 of Example 1, the read determining device 10 identifies the similar region in the determination target document using the technique of dividing the document image into regions or the technique of detecting the similar region. Since the read determining device 10 sets a reading speed for the similar region which is faster than that for the dissimilar region, as the criterion, the predicted reading time for the similar region is set to be shorter than the predicted reading time for the dissimilar region. Accordingly, it is possible to avoid a case where the read determining device 10 counts the number of characters in the document such that even the number of characters in a region is added, into which a close look is not desired, a time, for which the document is read, is determined depending on the number of characters, and thus, it is determined that the region is not the read region if the time depending on the number of relevant characters is not displayed. That is, it is possible to determine whether or not the determination target is read, with accuracy.

Example 2

According to Example 2, the determination target document processed by the read determining device 10 is assumed to be a document in which the same details are written in two different languages. For example, in a case where the same details are written in the user's native language and the other language, a non-native language region including the details written in the other language may not be read, when the user reads a native language region including the details that are written in the native language. Thus, the read determining device 10 may not add a reading time for the non-native language region to the predicted reading time and the threshold value of the predicted reading time is lowered, which is used for determining that the document is read.

Figure 16:
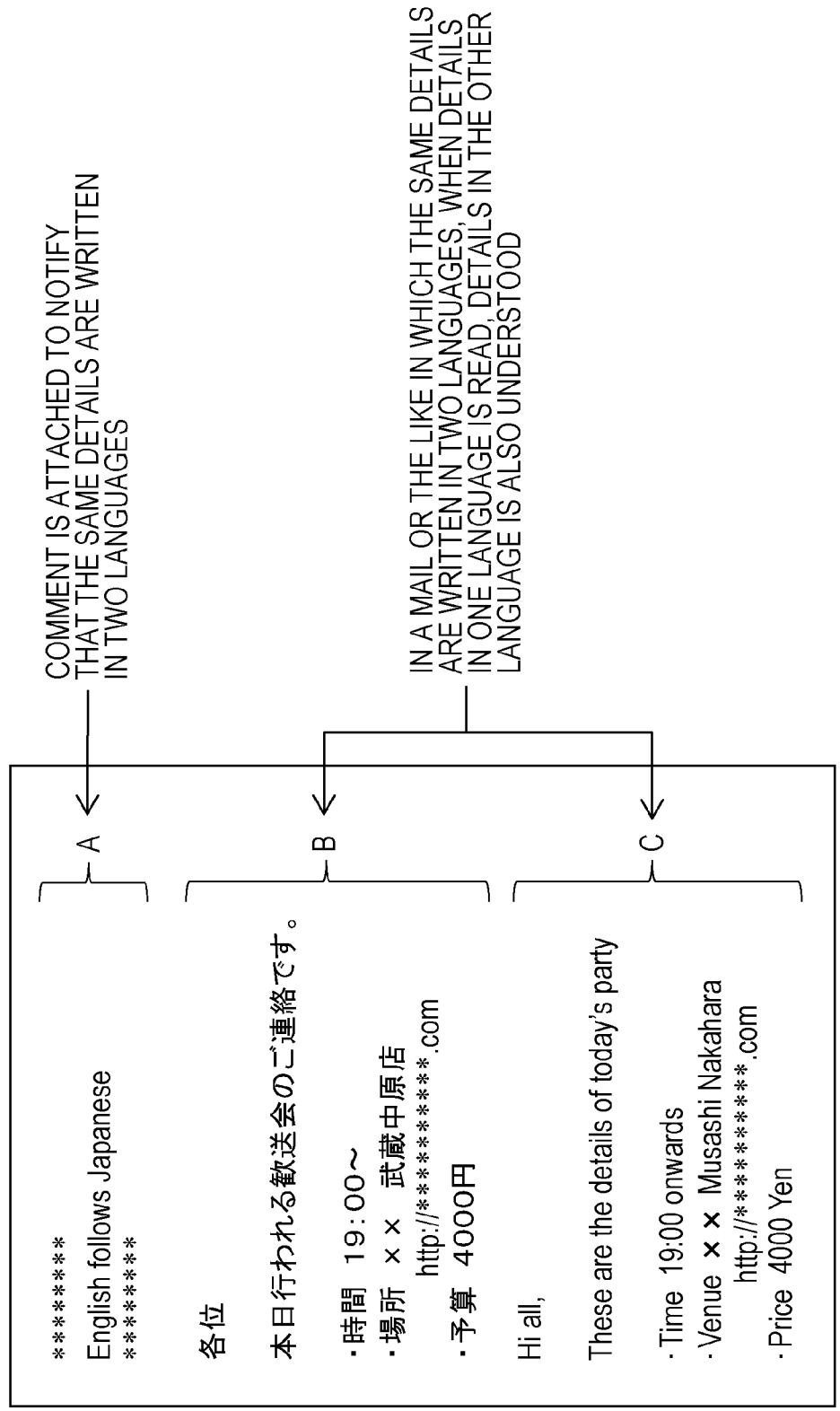
FIG. 16 illustrates an example of email including a text indicating that the same details are written in two languages and sentences of the same details written in two languages.

FIG. 16 illustrates an example of the determination target document according to Example 2. FIG. 16 illustrates an example of email including a text indicating that the same details are written in two languages and sentences of the same details written in two languages. In FIG. 16, a region indicated by (A) in the e-mail document contains a description indicating that the same details are written in two languages. A Region (B) in which the details are written in Japanese is continued next to a region (A). A Region (C) in which the same details as in the region (B) are written in English is continued next to the region (B). The region in which the same details are written may be divided into regions of the languages based on a text code, a document layout, or the like. The read determining device 10 identifies either one of (B) or (C) as the native language region depending on the user's native language and identifies the other region as the non-native language region. The non-native language region is an example of the similar portion. In addition, the native language region is an example of the dissimilar portion. The user's native language may be defined as user information in the database or the like in advance. In addition, FIG. 16 illustrates an example of the document in which the same details are written in two languages; however, the determination target document may be a document in which the same details are written in three or more languages.

Figure 17:
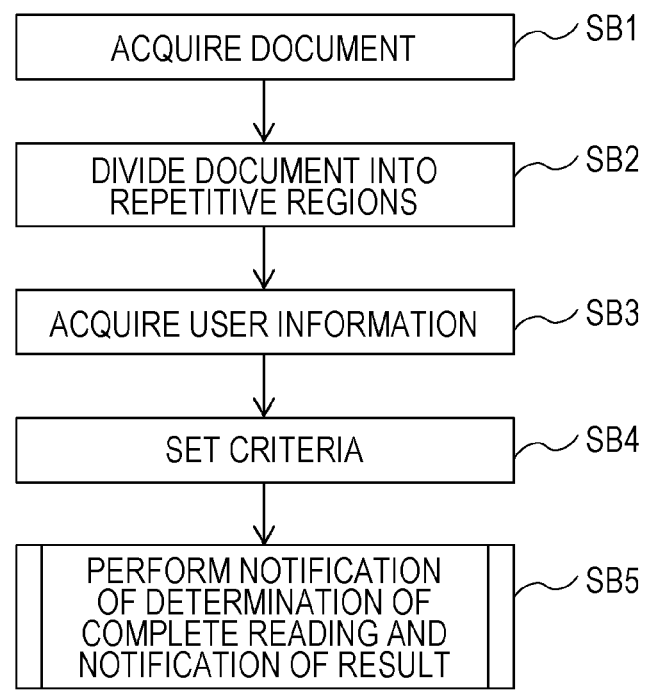
FIG. 17 illustrates an example of a flowchart of a process of determining whether or not a document is read according to Example 2.
Figure 18:
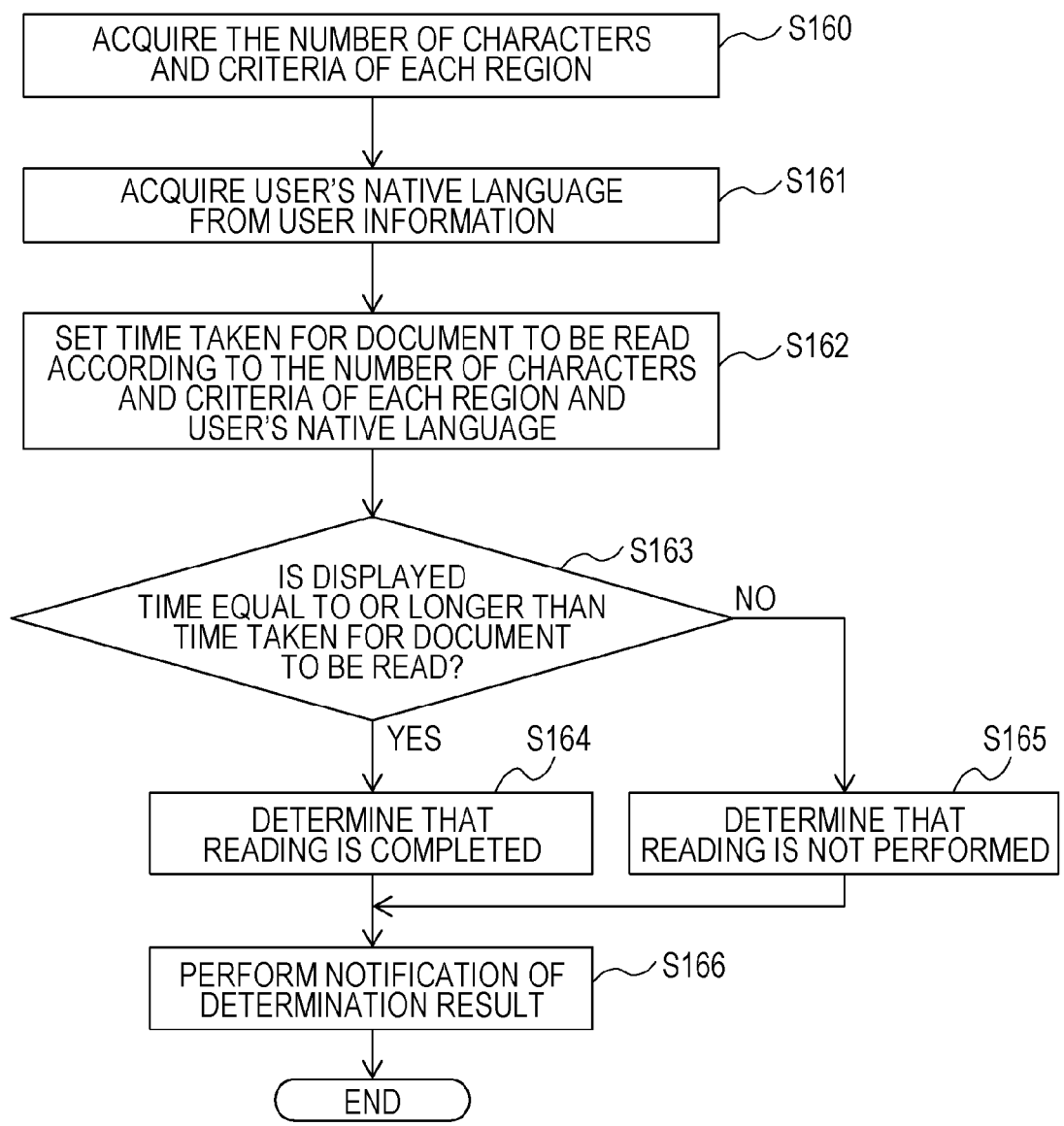
FIG. 18 illustrates an example of a flowchart of a process of determining whether or not the document is read with reference to a document opening time and user information, according to Example 2.

FIG. 17 and FIG. 18 illustrate a process of determining whether or not the determination target document according to Example 2 is read. FIG. 17 illustrates an example of a flowchart of a process of determining whether or not a document is read. FIG. 18 illustrates an example of a flowchart of a process of determining that the document is read and of notifying the result in SB5 of FIG. 17. The process in FIG. 17 starts, for example, when the determination target document is displayed on the output device 14.

In SB1, the read determining device 10 acquires the determination target document and proceeds to the process in SB2. In SB2, the read determining device 10 divides the determination target document so as to identify the repetitive region and proceeds to the process in SB3. In SB3, the read determining device 10 acquires the user information such as a user's native language and proceeds to the process in SB4. In SB4, the read determining device 10 sets criteria for the divided regions in the document and proceeds to the process in SB5. In SB5, the read determining device 10 determines whether or not the determination target document is read by the user, notifies the user of the determination result and, then, ends the process.

FIG. 18 illustrates an example of a flowchart of a process of determining whether or not the document is read with reference to a document opening time and user information, according to Example 2. The process in FIG. 18 starts, for example, when the read determining device 10 proceeds to the process of determining that the document is read and of notification of the result in SB5 of FIG. 17.

In S160, the read determining device 10 acquires the number of characters and criteria of each region and proceeds to the process in S161. In S161, the read determining device 10 acquires the user's native language with reference to the user information defined in advance in the database or the like and proceeds to the process in S162. In S162, the read determining device 10 sets the predicted reading time taken to read the document with reference to the number of characters and the criteria of the regions and the user's native language and proceeds to the process in S163. In S163, the read determining device 10 determines whether or not the determination target document is displayed for the predicted reading time or longer; then, proceeds to the process in S164 in a case where the determination target document is displayed for the predicted reading time or longer, and proceeds to the process in S165 in a case where the determination target document is not displayed for the predicted reading time or longer. In S164, the read determining device 10 determines that the determination target document is read and proceeds to the process in S166. In S165, the read determining device 10 determines that the determination target document is not read and proceeds to the process in S166. In S166, the read determining device 10 notifies the user of the determination result of whether or not the determination target document is read and ends the process.

Figure 19:
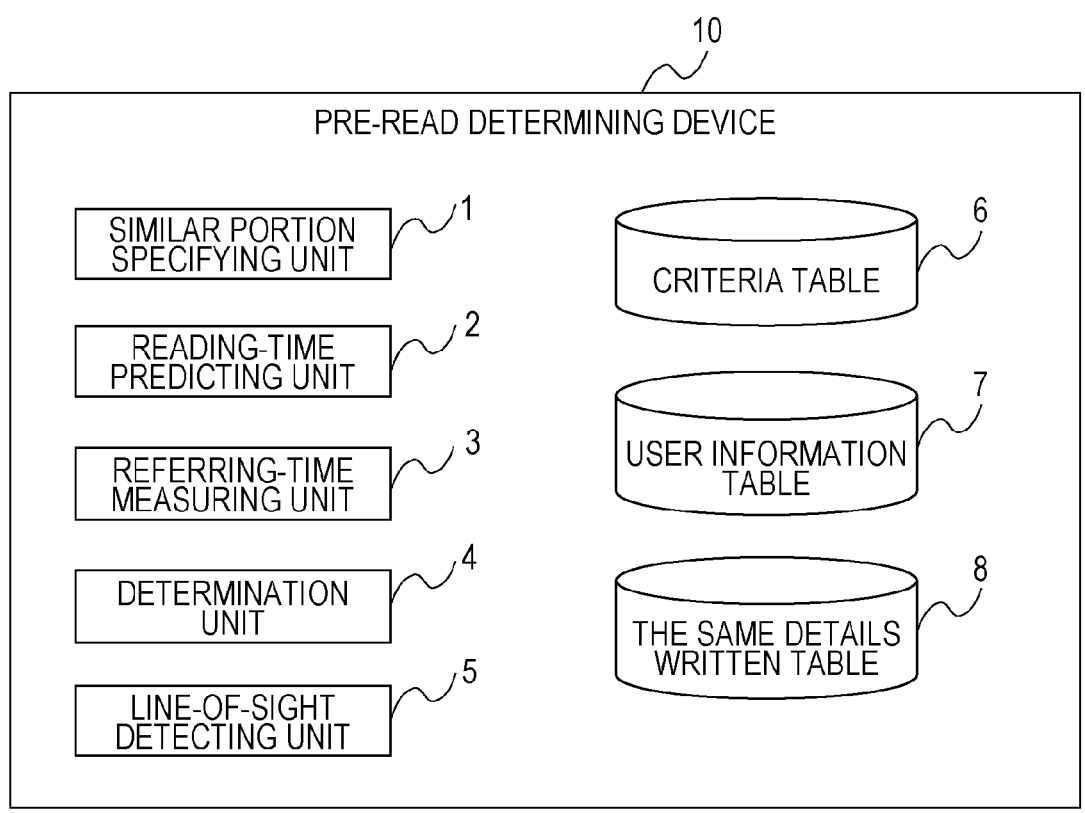
FIG. 19 illustrates an example of a block in which a process of a read determining device according to Example 2 is executed.

According to Example 2, since the hardware configuration is the same as in Example 1, the description thereof is omitted. FIG. 19 illustrates an example of a block in which a process of the read determining device according to Example 2 is executed. The same reference number is attached to the same process block as that in FIG. 5A and the description thereof is omitted. In FIG. 19, the read determining device 10 includes a user information table 7 and a same-details table 8, in addition to the same process block as that in FIG. 5A.

The user information table 7 defines attributes such as the native language, information of age such as school year, or a specialty as the user information. For example, the user information table 7 may cause a login user name when the user logs in the personal computer to be associated with the attributes such as the user's native language and, then, to be stored in the database or the like. The read determining device 10 sets the predicted reading time with reference to the user's attributes acquired from the user information table 7, in addition to the criteria and the amount of information of each region.

The same-details table 8 defines a writing example indicating that the same details are written in two languages. The same-details table 8 defines a writing example as "English follows Japanese" for the document in which the same details are written in English following Japanese. In a case where a character string of "English follows Japanese" is included in the determination target document, the read determining device 10 identifies a native language region and a non-native language region in the determination target document and sets the predicted reading time.

Example of Operation

Figure 20A:
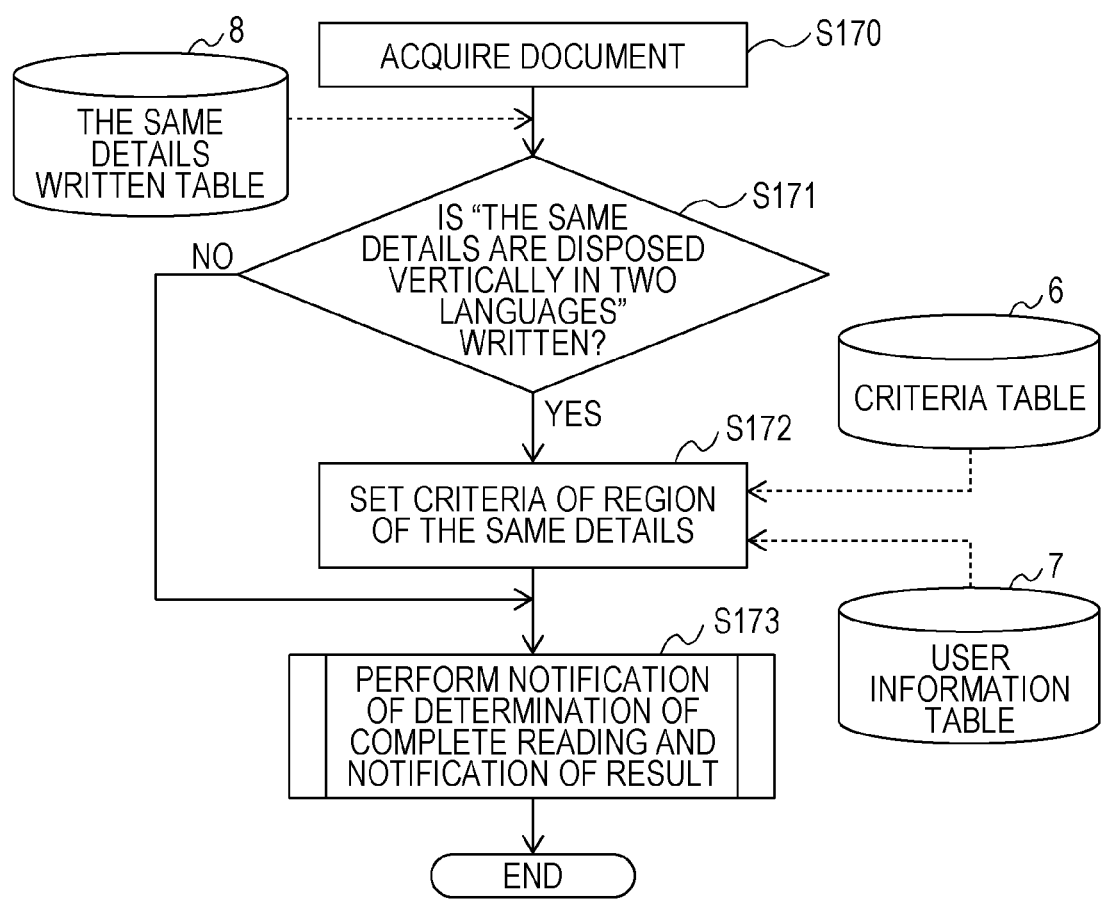
FIG. 20A illustrates an example of a flowchart of a process of determining whether or not the document including a text indicating that the same details are written in two languages and sentences of the same details written in two languages is read.

FIG. 20A illustrates an example of a flowchart of a process of determining whether or not the document is read, which includes a text indicating that the same details are written in two languages and sentences of the same details written in two languages. The process in FIG. 20A starts, for example, when the determination target document is displayed on the output device 14.

In S170, the read determining device 10 acquires the determination target document and proceeds to the process in S171. The read determining device 10 causes the determination unit 4 to perform processes from S171 to S173. In S171, the determination unit 4 refers to the same-details table 8 so as to determine whether or not a text indicating that the same details are written in two languages is contained in the acquired document; then, proceeds to the process in S172 in a case where the text is contained and proceeds to the process in S173 in a case where the text is not contained. FIG. 20B illustrates an example of the same-details table 8 in which a writing example indicating that the same details are written in two languages in a document in which the same details are written in two languages is defined. In an example of FIG. 20B, the same-details table 8 has two elements of language pair of "Japanese and English" and "English and Japanese". Writing attributes are defined for each language pair. For example, in the same-details table 8, a writing example of "English follows Japanese" is defined as the writing attributes for the "Japanese and English" pair which is the first element. At this time, whether or not the writing example of "English follows Japanese" is included in the determination target document makes it possible for the determination unit 4 to determine whether or not the same details are written in English, following the Japanese. In a case where the same details are written in English, the similar portion identifying unit 1 divides the document into regions of each language based on a text code, the layout of the document, or the like and it is possible to identify the regions as the similar portion. The identified portion may be a rectangle which contains a sentence written in each language or may be a region which surrounds the periphery of the sentence written in each language such that a predetermined distance from the character string is kept. In this way, a range of the region that is narrower than the rectangle which contains details written in each language is identified and thereby, it is possible for the reference time measuring unit 3 to measure the reference time with high accuracy. In addition, in the same-details table 8, a writing example of "Japanese follows English" is defined as the writing attributes for the "English and Japanese" pair which is the second element. Here, the elements of "Japanese and English" and "English and Japanese" are provided in an explanation column in terms of each language pair and are not used in the process of the determination unit 4. In the example of FIG. 20B, the writing example for two languages are illustrated; however, in the same-details table 8, the writing example indicating that the same details are written in three or more languages may be defined.

In S172, the determination unit 4 refers to the criteria table 6 and the user information table 7 so as to set the criteria for each region and proceeds to the process in S173. FIG. 20C illustrates an example of the user information table in which user information is defined, which is related to a user who reads the document in which the same details are written in two languages. In the example of FIG. 20C, the user information table 7 has two elements of user names of "user1" and "user2". The attributes of the native language are defined for each user name. For example, the user information table 7 defines "Japanese" for "user1" that is the first element, as the attribute of the native language. In addition, the user information table 7 defines "English" for "user2" that is the second element, as the attribute of the native language. Here, the defined attributes of "Japanese" and "English" are provided in an explanation column with respect to each user and are not used in the process of the determination unit 4.

FIG. 20D illustrates an example of the criteria table 6 in which criteria of determining the document in which the same details are written in two languages are defined. In the example of FIG. 20D, the criteria table 6 has two elements of regions of "native language region" and "non-native language region". The reading speed (characters/second) is defined for each region as the criteria. For example, the criteria table 6 defines the reading speed of 10 (characters/second) for the "native language region" which is the first element, as the criterion. In addition, the criteria table 6 defines the reading speed of 100,000 (characters/second) for the "non-native language region" which is the second element, as the criterion. The reading speed is defined as 100,000 (characters/second) such that the predicted reading time for the non-native language region becomes short to the extent that the predicted reading time is not considered. Here, the elements of "native language region" and "non-native language region" are provided in an explanation column in terms of each region and are not used in the process of the determination unit 4.

In S173, the determination unit 4 performs determining that the determination target document is read, displays the determination result on the output device 14, and ends the process. The process in S173 is illustrated in the processes of FIG. 8A to FIG. 8C described in Example 1.

According to Example 2, in a case where the text indicating that the same details are written in two languages is contained in the determination target document and the same details are written in different languages, the read determining device 10 identifies the region containing the details written in a language other than the user's native language as the non-native language region. The read determining device 10 sets the criteria such that the predicted reading time for the non-native language region is short to the extent that the predicted reading time is not considered. Accordingly, it is possible to avoid a case where the read determining device 10 counts the number of characters in the document such that even the number of characters in a region is added, into which a close look is not desired, a time, for which the document is read, is determined depending on the number of characters, and thus, it is determined that the region is not the read region if the time depending on the number of relevant characters is not displayed. That is, it is possible to determine whether or not the determination target is read, with accuracy.

Modification Example

According to a modification example of Example 2, the determination target document processed by the read determining device 10 is assumed to be a document in which the same details are written in different languages. Here, unlike Example 2, the determination target document does not include a text indicating that the same details are written. However, even when a text indicating that the same details are written is not present, the reading time taken to read the non-native language region may not be added to the predicted reading time in a case where the same details are written in different languages. As a method of identifying the native language region and the non-native language region, a technique is known, in which it is determined whether the same details are written in two languages in the document and the sentences written in two languages are associated to each other (for example, see Japanese Laid-open Patent Publication No. 9-179868). It is possible for the read determining device 10 to identify the native language region and the non-native language region using the technique. Accordingly, the read determining device 10 may not add a reading time for the non-native language region to the predicted reading time and the threshold value of the predicted reading time is lowered, which is used for determining that the document is read.

Figure 21:
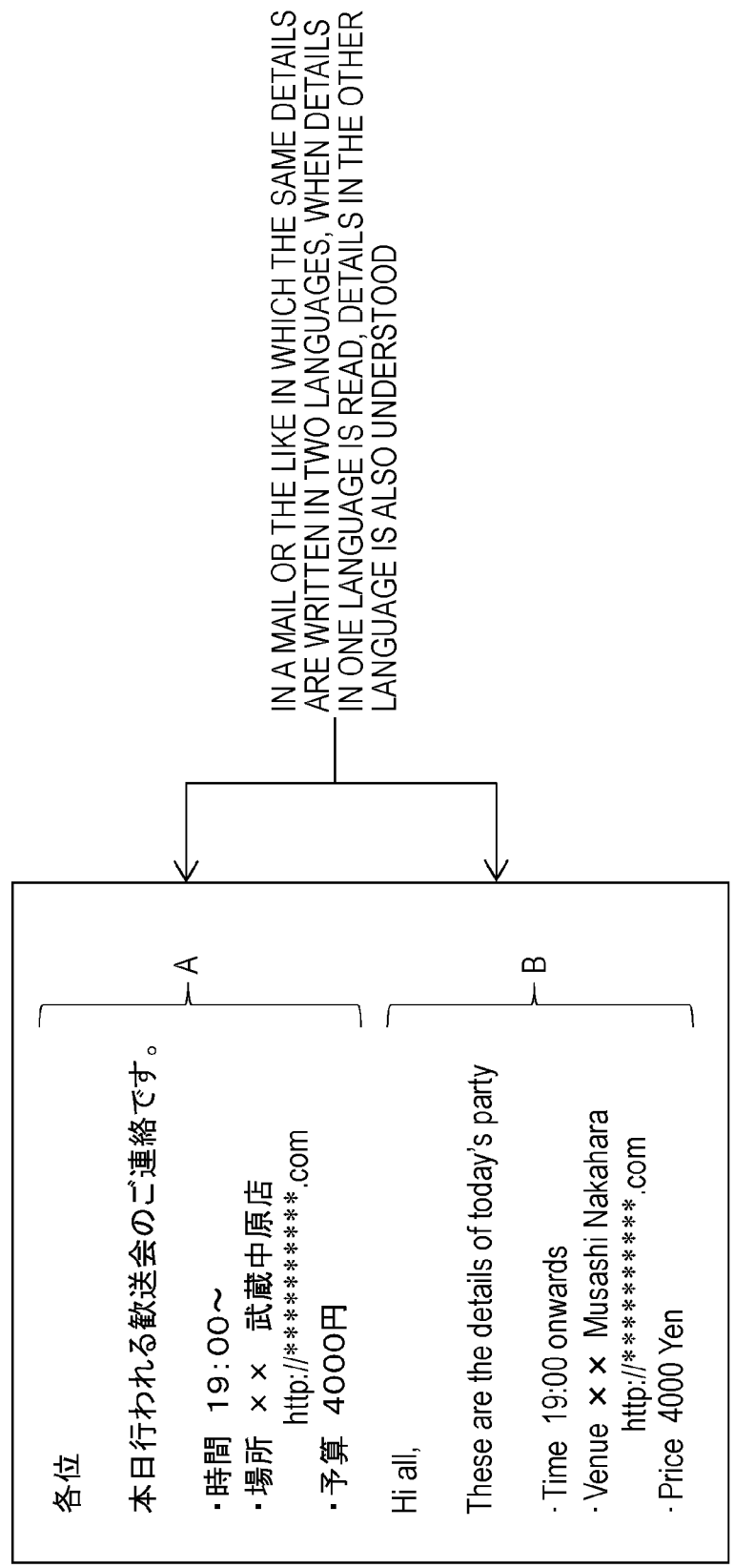
FIG. 21 illustrates an example of email in which the same details are written in two languages.

FIG. 21 illustrates an example of determination target document according to the modification example of Example 2. FIG. 21 illustrates an example of email in which the same details are written in two languages. In FIG. 21, a region of (B) in which texts are written in English follows a region of (A) in which texts are written in Japanese. The similar portion identifying unit 1 identifies either one of (A) or (B) as the native language region according to the user's native language and identifies the other region as the non-native language region. In the modification example of Example 2, since the hardware configuration and the process block are the same as in Example 2, the description thereof is omitted.

Example of Operation

Figure 22:
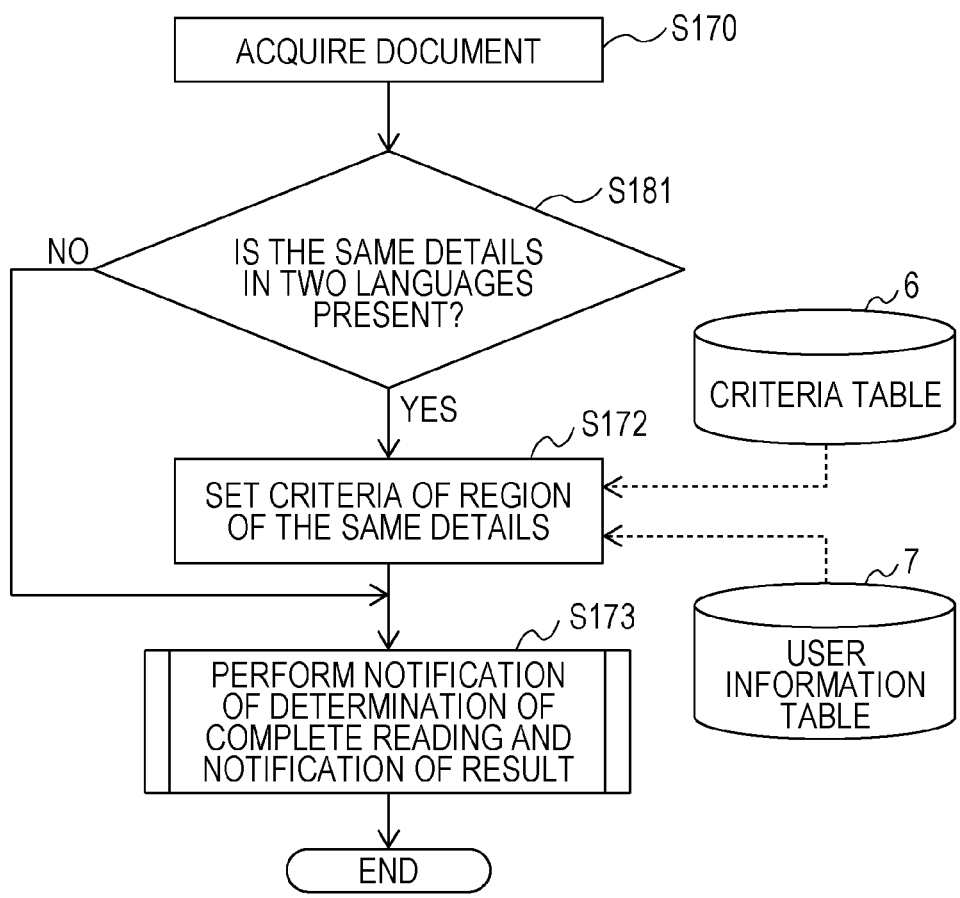
FIG. 22 illustrates an example of a flowchart of a process of determining whether or not the document in which the same details are written in two languages is read.

FIG. 22 illustrates an example of a flowchart of a process of determining whether or not the document in which the same details are written in two languages is read. The same reference number is attached to the same process as that in FIG. 20A and the description thereof is omitted.

In S181, the read determining device 10 determines whether or not the same details written in two languages are present in the determination target document. Here, the read determining device 10 determines whether the same details are written in two languages in the document and performs the process in S181 using a technique in which the sentences written in two languages are associated to each other. Next, in S181, the read determining device 10 proceeds to the process in S172 in a case where the same details written in two languages are present and proceeds to the process in S173 in a case where the same details written in two languages are not present. The processes from the S172 to the end are the same as those in FIG. 20A.

According to the modification example of Example 2, in a case where the same details are written in different languages in the determination target document, the read determining device 10 identifies the region containing the details written in a language other than the user's native language as the non-native language region. The read determining device 10 sets the criteria such that the predicted reading time for the non-native language region is short to the extent that the predicted reading time is not considered. Accordingly, it is possible to avoid a case where the read determining device 10 counts the number of characters in the document such that even the number of characters in a region is added, into which a close look is not desired, a time, for which the document is read, is determined depending on the number of characters, and thus, it is determined that the region is not the read region if the time depending on the number of relevant characters is not displayed. That is, it is possible to determine whether or not the determination target is read, with accuracy.

Example 3

According to Example 3, the determination target document processed by the read determining device 10 is assumed to be a document in which ruby is attached. For example, in a case where the ruby is attached to a Japanese character, a user may not read the ruby but may read a ruby base region in which the Japanese character is written in a case where the user knows how to read the Japanese character and the user may read a ruby text region in which the ruby is written in a case where the user does not know how to read Japanese character. (For the meaning of "ruby", refer to "http://www.w3.org/TR/ruby/#what".) The read determining device 10 determines whether the user reads the ruby base region or the ruby text region, with the user's attributes and the difficulty level of the details taken into account, and sets the criteria for the identified similar region. The read determining device 10 may add a reading time for either one of the ruby base region or the ruby text region to the predicted reading time and the threshold value of the predicted reading time is lowered, which is used for determining that the document is read.

Figure 23:
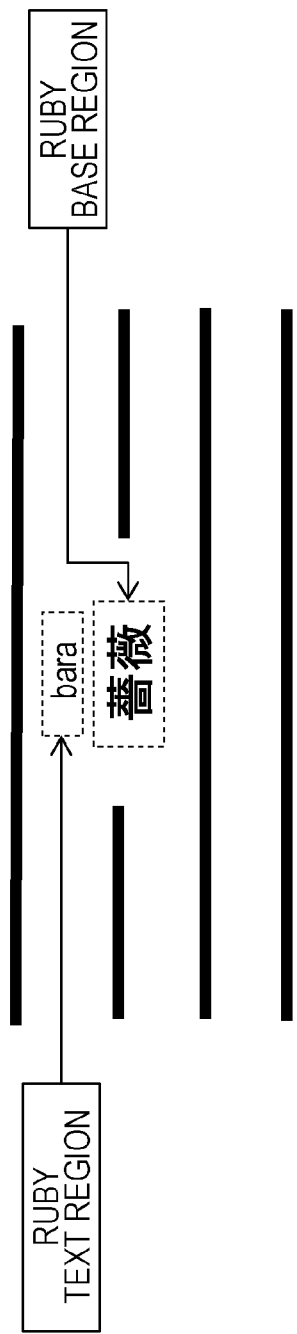
FIG. 23 illustrates an example of a document in which ruby is attached.

FIG. 23 illustrates an example of the determination target document according to Example 3. FIG. 23 illustrates an example of a document in which the ruby is attached. In FIG. 23, in the document, on Japanese characters 薔薇, which means "rose" in English, its pronunciation "bara" is attached as the ruby. The read determining device 10 identifies a region which includes the Japanese character 薔薇, as the ruby base region and a region which includes the ruby "bara", as the ruby text region. The read determining device 10 identifies a region which includes the ruby base region and the ruby text region as the similar region. The similar region is an example of the similar portion. According to Example 3, since the hardware configuration is the same as in Example 2, the description thereof is omitted. In addition, since the process block according to Example 3 is the same as the process block according to Example 2 except that the same-details table 8 is not included, the description thereof is omitted.

Example of Operation

Figure 24A:
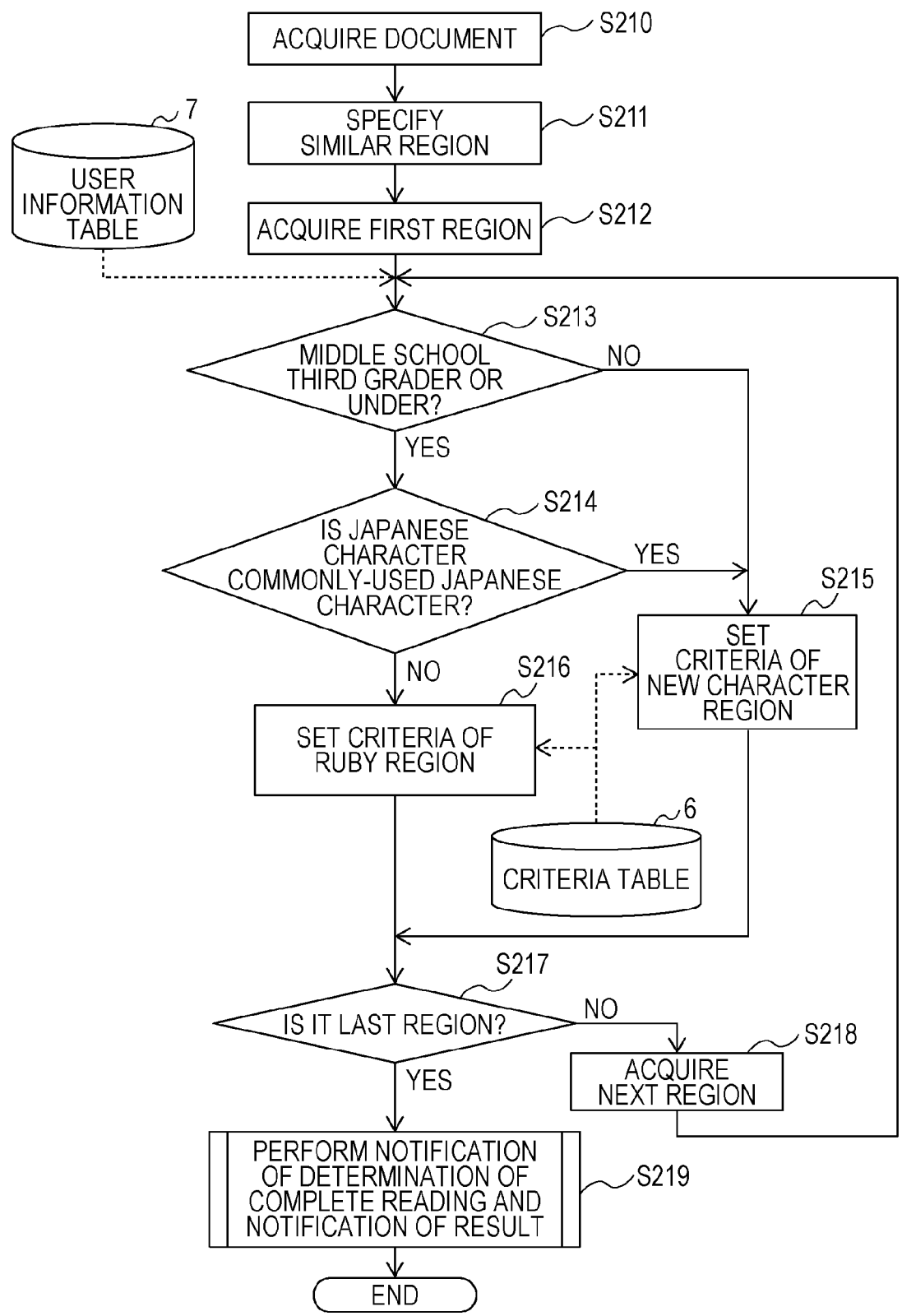
FIG. 24A illustrates an example of a flowchart of a process of determining whether or not the document with the attached ruby is read.

FIG. 24A illustrates an example of a flowchart of a process of determining whether or not the document with the attached ruby is read. The process in FIG. 24A starts, for example, when the determination target document is displayed on the output device 14.

In S210, the read determining device 10 acquires the determination target document and proceeds to the process in S211. The read determining device 10 causes the determination unit 4 to perform processes from S211 to S219. In S211, the determination unit 4 identifies a similar region (including the ruby base region and the ruby text region) in the determination target document and proceeds to the process in S212. Here, for example, in a document of which a document structure such as the HTML document is known, when identifying the ruby base region and the ruby text region, it is possible to identify the ruby region from structural information (in a case of the HTML document, a <ruby> tag which indicates there is a ruby region or the like). In a document, such as a scanned image, of which a structure is not known, the ruby base region and the ruby text region may be identified using a technique in which the document is divided into the ruby region and the Japanese character region using the layout, the font size, the position, or the like (for example, see Japanese Laid-open Patent Publication No. 2002-56357 or the like). In addition, the identified region may be a rectangle which contains a ruby base and the ruby text or may be a region which surrounds the periphery of the character string of the ruby base and the ruby text such that a predetermined distance from the character string is kept. In this way, a range of the region that is narrower than the rectangle which contains the ruby base and the ruby text is identified and thereby, it is possible for the reference time measuring unit 3 to measure the reference time with high accuracy.

In S212, the determination unit 4 acquires the first region identified in S211 and proceeds to the process in S213. In S213, the determination unit 4 determines whether or not a user who refers to the determination target document is a middle school third grader or under with reference to the user information table 7 illustrated in FIG. 24B; then, proceeds to the process in S214 in a case where the user is the middle school third grader or under and proceeds to the process in S215 in a case where the user is not the middle school third grader or under. FIG. 24B illustrates an example of the user information table in which user information is defined, which is related to a user who reads the document with the attached ruby. In the example of FIG. 24B, the user information table 7 has two elements of user names of "user1" and "user2". The attributes of the school year are defined for each user name. For example, the user information table 7 defines "college graduate" for "user1" that is the first element, as the attribute of the school year. In addition, the user information table 7 defines "second grader in elementary school" for "user2" that is the second element, as the attribute of the school year. Here, the defined attributes of "college graduate" and "second grader in elementary school" are provided in an explanation column with respect to each user and are not used in the process of the determination unit 4. In an example in S213, it is determined whether or not the user is the middle school third grader or under; however, the school year is an example of a criterion for determining whether the ruby base region is read or the ruby text region is read and an appropriate criterion may be set, with the user's attributes taken into account.

In S214, the determination unit 4 determines whether or not a Japanese character in the ruby base region is a commonly-used Japanese character; then, proceeds to the process in S215 in a case where the Japanese character in the ruby base region is a commonly-used Japanese character and proceeds to the process in S216 in a case where the Japanese character is not a commonly-used Japanese character. In S215, the determination unit 4 sets the criteria of the ruby base region for the acquired region. Specifically, the determination unit 4 refers to the criteria table 6 illustrated in FIG. 24C and sets a reading speed of 10 (characters/second) which is the criterion of the ruby base region for the acquired region as the "a user is a high school first grader or higher, or commonly-used Japanese character" region and proceeds to the process in S217. In S216, the determination unit 4 sets the criteria of the ruby text region for the acquired region. Specifically, the determination unit 4 refers to the criteria table 6 illustrated in FIG. 24C, sets a reading speed of 8 (characters/second) which is the criterion of the ruby text region for the acquired region as the "a user is a middle school third grader or under, and uncommonly-used Japanese character" region, and proceeds to the process in S217. Here, the attributes representing the elements and the criteria for each region, which are illustrated in the criteria table 6 of FIG. 24C are provided in an explanation column and are not used in the process of the determination unit 4. In an example in S214, it is determined whether or not the Japanese character in the ruby base region is a commonly-used Japanese character; however, it is an example of a criterion for determining whether the ruby base region is read or the ruby text region is read and an appropriate criterion may be set, with the difficulty level of the Japanese character taken into account.

In S217, the determination unit 4 determines whether or not the acquired region is the last region identified in S211; then, proceeds to the process in S219 in a case where the acquired region is the last region and proceeds to the process in S218 in a case where the acquired region is not the last region. In S218, the determination unit 4 acquires the next region of the acquired region and returns to the process in S213. In S219, the determination unit 4 performs determining that the determination target document is read, displays the determination result on the output device 14, and ends the process. The process in S219 is illustrated by the processes from FIG. 8A to FIG. 8C described in Example 1.

According to Example 3, the read determining device 10 identifies the region including the ruby base region and the ruby text region as the similar region in the document in which the ruby is attached. The read determining device 10 sets the criteria for each similar region, with the user's attributes and the difficulty level of the details taken into account. Thus, it is possible for the read determining device 10 to set a predicted reading time to which a reading time for the ruby base region or the ruby text region is not added, depending on the user's attributes and the difficulty level of the details. Accordingly, it is possible to avoid a case where the read determining device 10 counts the number of characters in the document such that even the number of characters in a region is added, into which a close look is not desired, a time, for which the document is read, is determined depending on the number of characters, and thus, it is determined that the region is not the read region if the time depending on the number of relevant characters is not displayed. That is, it is possible to determine whether or not the determination target is read, with accuracy.

Modification Example 1

According to Modification Example 1 of Example 3, similar to Example 3, the determination target document processed by the read determining device 10 is assumed to be a document in which ruby is attached. According to Example 3, the read determining device 10 sets the criteria for the similar region, with the user's attributes and the difficulty level of the details taken into account; however, according to Modification Example 1 of Example 3, the read determining device 10 sets the criteria for the similar region, with the user's specialty taken into account. The read determining device 10 may not add a reading time for the ruby text region to the predicted reading time regarding a technical term in the user's specialty and the threshold value of the predicted reading time is lowered, which is used for determining that the document is read.

Figure 25:
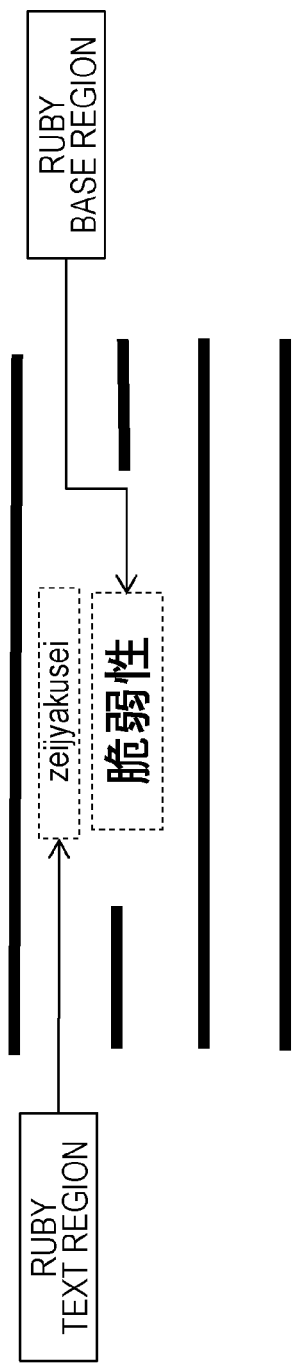
FIG. 25 illustrates an example of a document in which the ruby is attached to a technical term.

FIG. 25 illustrates an example of the determination target document according to Modification Example 1 of Example 3. FIG. 25 illustrates an example of the document in which the ruby is attached to a technical term. In FIG. 25, a sentence in the document is represented by a straight line. On Japanese characters 脆弱性, which means "vulnerability" in English, written in the document, its pronunciation "zei-jyakusei" is attached as the ruby text. The read determining device 10 identifies a region which includes the Japanese character, 脆弱性, as the ruby base region and a region which includes the ruby, "zeijyakusei", as the ruby text region. The read determining device 10 identifies a region which includes the ruby base region and the ruby text region as the similar region. The similar region is an example of the similar portion. According to Modification Example 1 of Example 3, since the hardware configuration and the process block are the same as in Example 3, the description thereof is omitted.

Example of Operation

Figure 26:
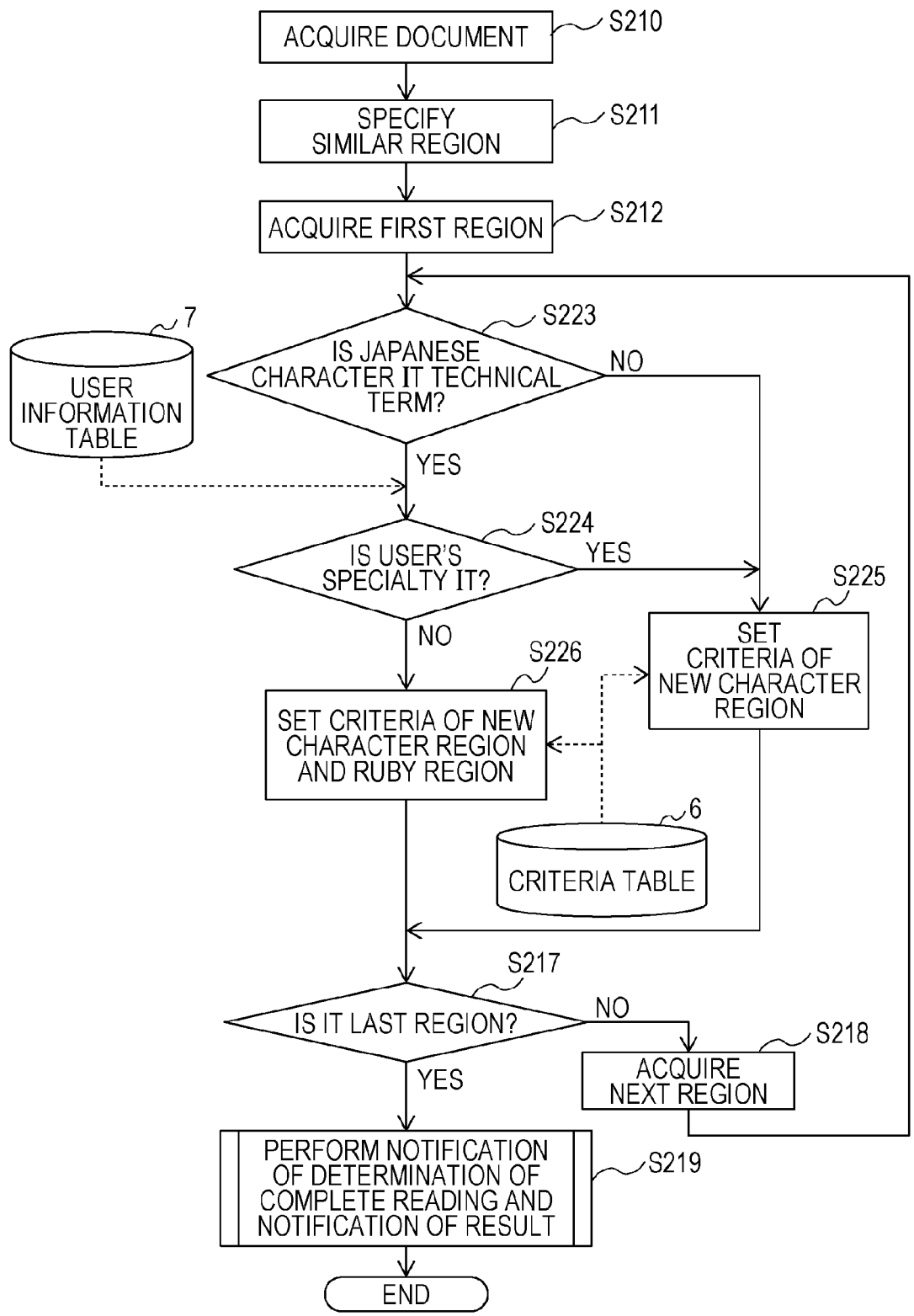
FIG. 26A illustrates an example of a flowchart of a process of determining whether or not the document with the ruby attached to the technical term is read.
FIG. 26B illustrates an example of a user information table in which user information is defined, which is related to a user who reads the document with the ruby attached to the technical term.
FIG. 26C illustrates an example of a criteria table in which criteria of determining the document with the ruby attached to the technical term are defined.

FIG. 26A illustrates an example of a flowchart of a process of determining whether or not the document with the ruby attached to the technical term is read. The same reference number is attached to the same process as that in FIG. 24A and the description thereof is omitted.

In S223, the determination unit 4 determines whether or not a Japanese character in the ruby base region is a technical term used in the IT field; then, proceeds to the process in S224 in a case where the Japanese character in the ruby base region is the technical term used in the IT field and proceeds to the process in S225 in a case where the Japanese character is not a technical term used in the IT field. A table (not illustrated) may be defined in advance, in which a specialty and technical terms in the specialty are associated so as to determine whether or not the Japanese character is a technical term.

In S224, the determination unit 4 determines whether or not the specialty of the user who refers to the determination target document is the IT field, with reference to the user information table 7 illustrated in FIG. 26B; then, proceeds to the process in S225 in a case where the user's specialty is the IT field and proceeds to the process in S226 in a case where the user's specialty is not the IT field. FIG. 26B illustrates an example of the user information table in which user information is defined, which is related to the user who reads the document with the ruby attached to the technical term. In the example of FIG. 26B, the user information table 7 has two elements of user names of "user1" and "user2". The attributes of the specialty are defined for each user name. For example, the user information table 7 defines "IT" for "user1" that is the first element, as the attribute of the specialty. In addition, the user information table 7 defines "medicine" for "user2" that is the second element, as the attribute of the specialty. Here, the defined attributes of "IT" and "medicine" are provided in an explanation column with respect to each user and are not used in the process of the determination unit 4.

In S225, the determination unit 4 sets the criteria of the ruby base region for the acquired region. Specifically, the determination unit 4 refers to the criteria table 6 illustrated in FIG. 26C and sets a reading speed of 10 (characters/second) which is the setting criterion of the ruby base region as the "the Japanese character is not the IT technical term or the user's specialty is IT" region and proceeds to the process in S217.

In S226, the determination unit 4 sets the criteria of the ruby base region and the ruby text region for the acquired region. Specifically, the determination unit 4 refers to the criteria table 6 illustrated in FIG. 26C and sets a reading speed of 10 (characters/second) to the ruby base region and a reading speed of 8 (characters/second) to the ruby text region for the acquired region as the "the Japanese character is the IT technical term and the user's specialty is not IT" region. This is because a user who has a different specialty may read both the ruby base region and the ruby text region in a case where Japanese characters of the technical term appear again. Next, the determination unit 4 proceeds to the process in S217. Here, the attributes representing the elements and the criteria for each region, which are illustrated in the criteria table 6 of FIG. 26C are provided in an explanation column and are not used in the process of the determination unit 4. In addition, in an example of FIG. 26C, an example of setting the criteria of the ruby base region and the ruby text region and an example of setting the criteria of the ruby base region are illustrated, but the setting of the criteria is not limited thereto. For example, the criteria of the ruby text region may be set for the "the Japanese character is the IT technical term and the user's specialty is not IT" region.

According to Modification Example 1 of Example 3, the read determining device 10 identifies the region including the ruby base region and the ruby text region as the similar region in the document in which the ruby is attached. The read determining device 10 sets the criteria for each similar region, with the user's specialty and whether or not the Japanese character is the technical term taken into account. Thus, it is possible for the read determining device 10 to set a predicted reading time to which a reading time for the ruby base region or the ruby text region is not added, depending on the user's specialty and whether or not the Japanese character is the technical term. Accordingly, it is possible to avoid a case where the read determining device 10 counts the number of characters in the document such that even the number of characters in a region is added, into which a close look is not desired, a time, for which the document is read, is determined depending on the number of characters, and thus, it is determined that the region is not the read region if the time depending on the number of relevant characters is not displayed. That is, it is possible to determine whether or not the determination target is read, with accuracy.

Modification Example 2

According to Modification Example 2 of Example 3, the determination target document processed by the read determining device 10 is assumed to be a document in which the word represented by the abbreviation is written together with the abbreviation. According to Example 3, the read determining device 10 sets the criteria for the similar region, with the user's attributes and the difficulty level of the details taken into account; however, according to Modification Example 2 of Example 3, the read determining device 10 sets the criteria for the similar region, with the user's specialty taken into account. The read determining device 10 may not add a reading time for an abbreviated word region to the predicted reading time regarding a technical term in a case where the user has high knowledge in a special field and the threshold value of the predicted reading time is lowered, which is used for determining that the document is read.

Figure 27:
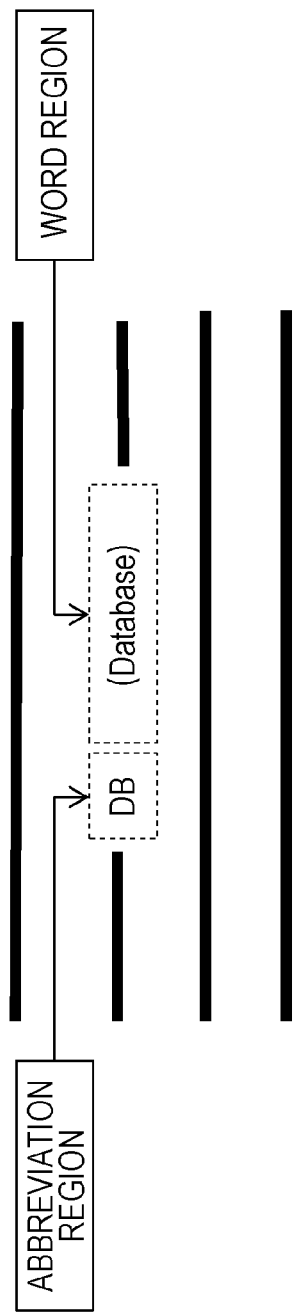
FIG. 27 illustrates an example of a document in which a word representing an abbreviation is written together with the abbreviation of a technical term.

FIG. 27 illustrates an example of the determination target document according to Modification Example 2 of Example 3. FIG. 27 illustrates an example of a document in which a word represented by an abbreviation is written together with the abbreviation of a technical term. In FIG. 27, a sentence in the document is represented by a straight line. On the right side of an abbreviation of "DB" in the document, a word of "Database" which is represented by "DB" is written in parentheses. The read determining device 10 identifies a region which includes the abbreviation of "DB" as an abbreviation region and a region which includes the word of "Database" as a word region. It is possible to identify the abbreviation region and the word region by detecting a character string in parentheses following capitals in English. In addition, the characters such as "(" or ")" may be not included in the read determination target. The read determining device 10 identifies a region which includes the abbreviation region and the word region as the similar region. The similar region is an example of the similar portion. According to Modification Example 2 of Example 3, since the hardware configuration and the process block are the same as in Example 3, the description thereof is omitted.

Example of Operation

Figure 28A:
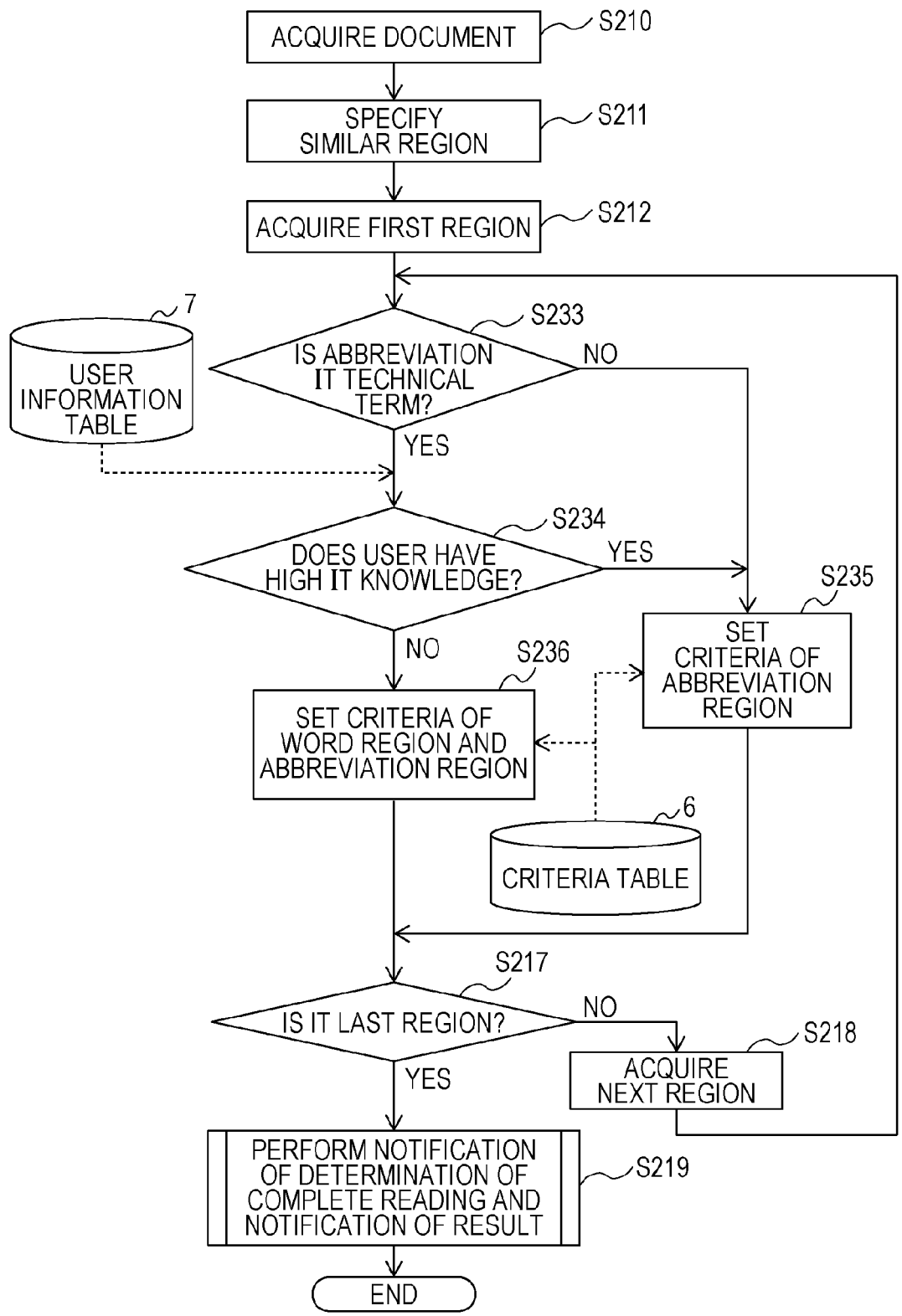
FIG. 28A illustrates an example of a flowchart of a process of determining whether or not the document is read, in which a word representing an abbreviation is written together with the abbreviation of a technical term.

FIG. 28A illustrates an example of a flowchart of a process of determining whether or not the document is read, in which a word represented by an abbreviation is written together with the abbreviation of a technical term. The same reference number is attached to the same process as that in FIG. 24A and the description thereof is omitted.

In S233, the determination unit 4 determines whether or not the abbreviation in the abbreviation region is a technical term used in the IT field; then, proceeds to the process in S234 in a case where the abbreviation in the abbreviation region is a technical term used in the IT field and proceeds to the process in S235 in a case where the abbreviation is not a technical term used in the IT field. A table (not illustrated) may be defined in advance, in which a specialty and technical terms in the specialty are associated so as to determine whether or not the word is a technical term.

In S234, the determination unit 4 determines whether or not the user who refers to the determination target document has a high level of knowledge in the IT field with reference to the user information table 7 illustrated in FIG. 28B; then, proceeds to the process in S235 in a case where the user has a high level of knowledge in the IT field and proceeds to the process in S236 in a case where the user does not have a high level of knowledge in the IT field. FIG. 28B illustrates an example of a user information table in which user information is defined, which is related to a user who reads the document in which a word represented by an abbreviation is written together with the abbreviation of a technical term. In the example of FIG. 28B, the user information table 7 has two elements of user names of "user1" and "user2". The attributes of the IT specialty level are defined for each user name. For example, the user information table 7 defines "low" for "user1" that is the first element, as the attribute of the IT specialty level. In addition, the user information table 7 defines "high" for "user2" that is the second element, as the attribute of the IT knowledge level. Here, the defined attributes of "high" and "low" are provided in an explanation column with respect to each user and are not used in the process of the determination unit 4.

In S235, the determination unit 4 sets the criteria of the abbreviation region for the acquired region. Specifically, the determination unit 4 refers to the criteria table 6 illustrated in FIG. 28C and sets a reading speed of 10 (characters/second) which is the setting criterion of the abbreviation region as the "the abbreviation is not the IT technical term or the user has a high knowledge in IT" region and proceeds to the process in S217.

In S236, the determination unit 4 sets the criteria of the abbreviation region and the word region for the acquired region. Specifically, the determination unit 4 refers to the criteria table 6 illustrated in FIG. 28C and sets a reading speed of 10 (characters/second) to the abbreviation region and a reading speed of 8 (characters/second) to the word region for the acquired region as the "the abbreviation is the IT technical term and the user has a low knowledge in IT" region. This is because a user who has a low knowledge in IT may read both the abbreviation region and the word region in a case where the abbreviation of the technical term appears again. Next, the determination unit 4 proceeds to the process in S217. Here, the attributes representing the elements and the criteria for each region, which are illustrated in the criteria table 6 of FIG. 28C are provided in an explanation column and are not used in the process of the determination unit 4. In addition, in an example of FIG. 28C, an example of setting the criteria of the abbreviation region and the word region and an example of setting the criteria of the abbreviation region are illustrated; however, the setting of the criteria is not limited thereto. For example, the criteria of the word region may be set for the "the abbreviation is the IT technical term and the user has a low knowledge in IT" region.

According to Modification Example 2 of Example 3, the read determining device 10 identifies the region including the abbreviation region and the word region as the similar region in the document in which the word represented by the abbreviation is written together with the abbreviation. The read determining device 10 sets the criteria for each similar region, with the user's IT specialty level and whether or not the abbreviation is a technical term taken into account. Thus, it is possible for the read determining device 10 to set a predicted reading time to which a reading time for the abbreviation region or the word region is not added, depending on the user's IT specialty level and whether or not the abbreviation is the technical term. Accordingly, it is possible to avoid a case where the read determining device 10 counts the number of characters in the document such that even the number of characters in a region is added, into which a close look is not desired, a time, for which the document is read, is determined depending on the number of characters, and thus, it is determined that the region is not the read region if the time depending on the number of relevant characters is not displayed. That is, it is possible to determine whether or not the determination target is read, with accuracy.

Example 4

According to Example 4, the determination target document processed by the read determining device 10 is assumed to be a document which includes a link to another document. The read determining device 10 may process multiple documents including a link target document as the determination target document. For example, in a case where the link to another document is included in the determination target document, the details of the link source document are not understandable if the link target document is not read, in some cases. Since the original object of the link source document is to guide to the link target document, it is possible to determine that the determination target document, which is the link source, is read in a case where the link target document is read.

In many cases, information related to the link target is written before and after the link to another document, and particularly immediately before the link. Thus, for even the document which, first, becomes the link target so as to be read, the same details as those written in the link source are set to be read by the user. Therefore, in a case where the same character strings as those in the read details of the link source document are included in a part of the link target, the criteria are set such that the character strings in the link target are read and thereby, it is possible to determine whether or not the link target document is read, with high accuracy. Here, the same character string may be character strings of a line, a sentence, or a paragraph position or may be a line change, a word with a predetermined length, or a clause.

The read determining device 10 sets, as the criterion, a reading speed which is faster than that of a region that is not similar to the similar region which is similar to the link source document even in the link target document. In this way, the reading time for the similar region of the link target document which is predicted based on the criteria and an amount of information becomes shorter than the predicted reading time for the dissimilar region and a threshold value of the predicted reading time is lowered, which is used for determining that the document is read.

Figure 29A:
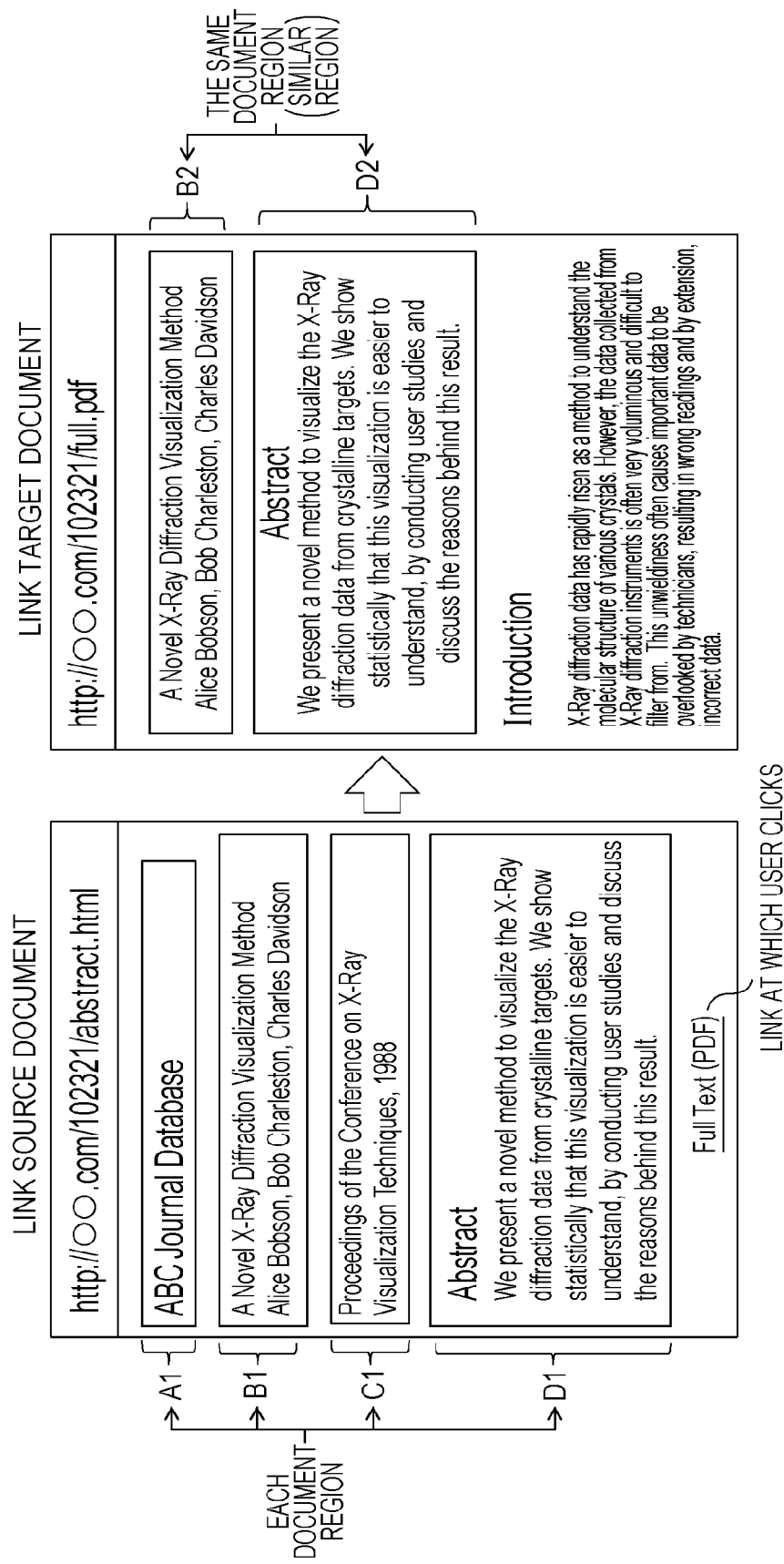
FIG. 29A illustrates examples of a link source document that includes a link and a link target document.

FIG. 29A illustrates an example of the determination target document according to Example 4. FIG. 29A illustrates examples of the link source document that includes a link and a link target document. In the link target document, the similar region is identified as follows. The link source document is divided into four regions of (A1), (B1), (C1), and (D1) with the font size, a line change, or the like as a separator. A character string of "Full Text (PDF)" is written as a link target in the last line of the link source document. When the link is clicked, the link target document is displayed. The link target document includes regions of (B1) of the link source document and (B2) in which the same character strings are written. In addition, the link target document includes regions of (D1) of the link source document and (D2) in which the same character strings are written. In a case where (B1) and (D1) of the link source document are read, the similar portion identifying unit 1 identifies the regions of (B2) and (D2) of the link target document as the similar regions.

Figure 29B:
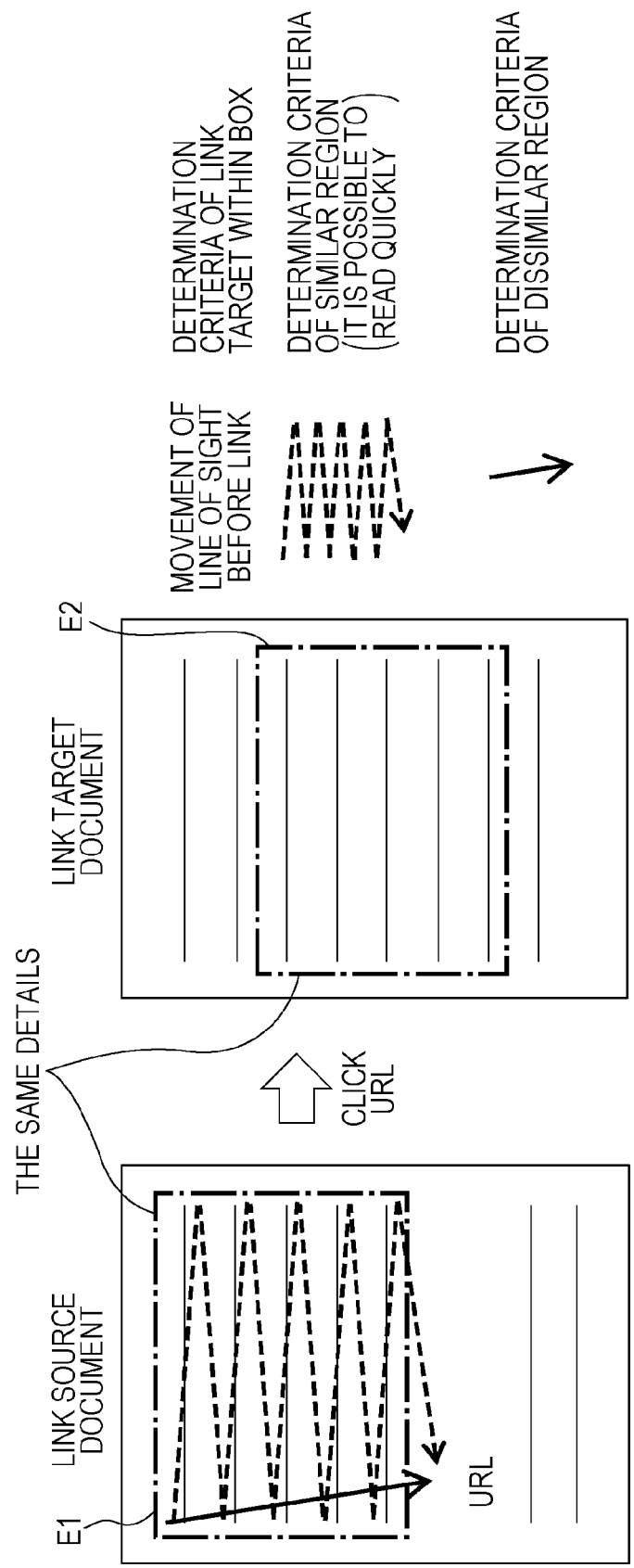
FIG. 29B illustrates schematic examples of FIG. 29A.

FIG. 29B illustrates schematic examples of FIG. 29A. Details of a region (E2) surrounded by a dashed line in the link target document are the same as details of a region (E1) surrounded by a dashed line in the link source document. In the link source document, the similar portion identifying unit 1 identifies the (E2) region of the landing target as a similar region in a case where the line of sight is detected as illustrated by a dotted line in the entire (E1) region and it is determined that (E1) region is read. In the link source document, the similar portion identifying unit 1 identifies the (E2) region of the link target as a dissimilar region in a case where the line of sight is detected as illustrated by a double line in a part of (E1) region and it is determined that (E1) region is not read.

According to Example 4, the link to another document is described as an example, but it is possible for the read determining device 10 to determine that the determination target document is read in a case where an attached file attached in the determination target document is read. Further, the read determining device 10 may determine that the determination target document is read in a case where a user operation such as switching of display languages of a page is detected. According to Example 4, since the hardware configuration and the process block are the same as in Example 1, the description thereof is omitted.

Example of Operation

Figure 30:
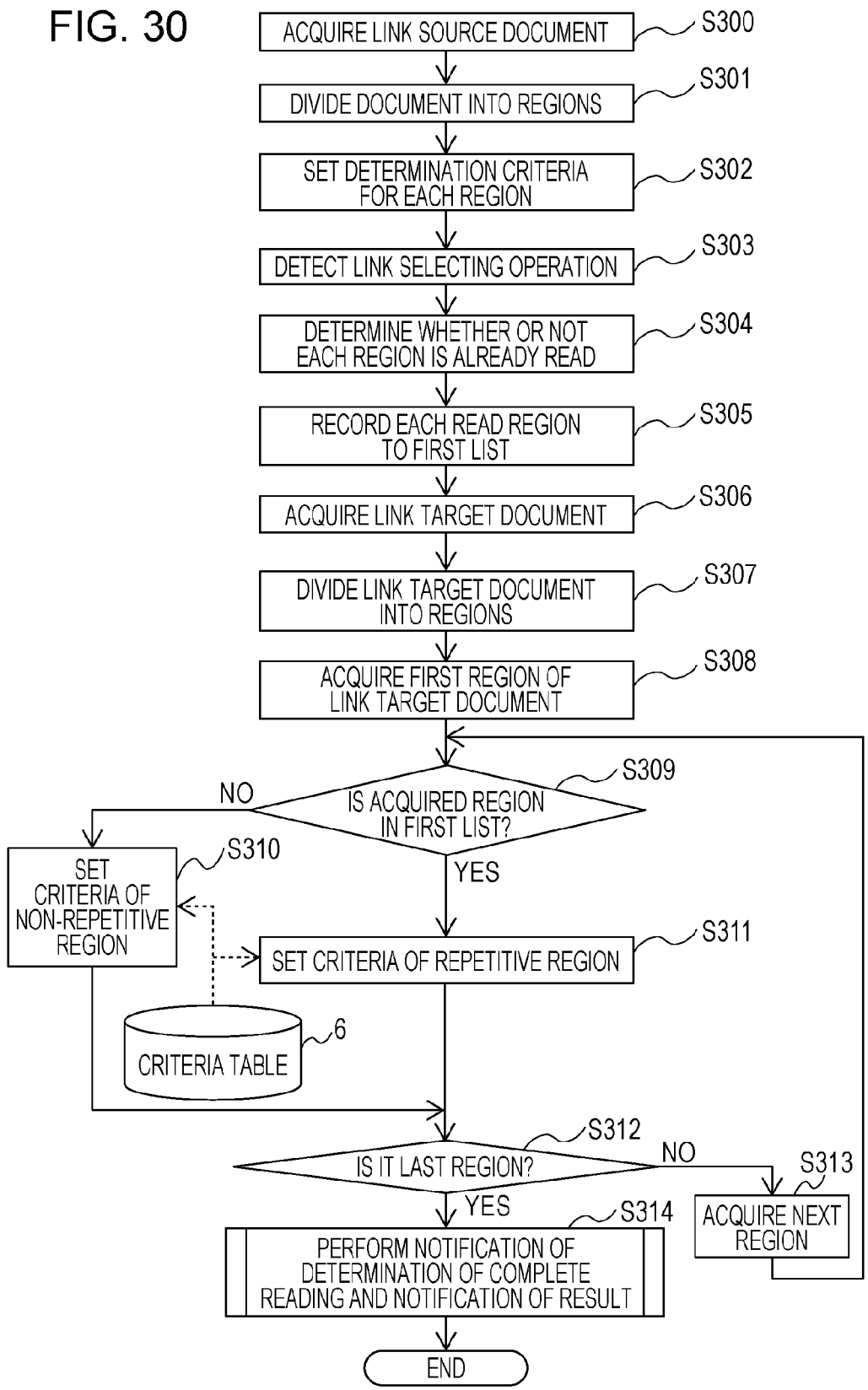
FIG. 30 illustrates an example of a flowchart of a process of determining whether or not the link target document is read.

FIG. 30 illustrates an example of a flowchart of a process of determining whether or not the link target document is read. The process in FIG. 30 starts, for example, when the determination target document is displayed on the output device 14. In the process in FIG. 30, the similar region is the repetitive region and the dissimilar region is the non-repetitive region.

In S300, the read determining device 10 acquires the determination target document and proceeds to the process in S301. In S301, the read determining device 10 causes the similar portion identifying unit 1 to divide the determination target document into regions and proceeds to the process in S302.

In S302, the read determining device 10 causes the determination unit 4 to set a criterion for each region. For setting of the criteria, it is possible to set by a method described in Examples 1 to 3. Next, the read determining device 10 proceeds to the process in S303. In S303, the read determining device 10 detects a link selecting operation by the user and proceeds to the process in S304. In S304, the read determining device 10 determines whether or not each region is read and proceeds to the process in S305. In S305, the read determining device 10 adds the region determined to be read to the first encountered list and proceeds to the process in S306. Here, the first encountered list may be stored temporarily in the main storage device 12 or may be stored in the auxiliary storage device 15 using a database or the like. In S306, the read determining device 10 acquires the link target document and proceeds to the process in S307. In S307, the read determining device 10 causes the similar portion identifying unit 1 to divide the link target document into regions. Here, similar to processes described in Example 1 to Example 3, it is possible for the similar portion identifying unit 1 to identify the similar portion. Next, the read determining device 10 proceeds to the process in S308. In S308, the read determining device 10 acquires the first region of the link target document and proceeds to the process in S309. The read determining device 10 causes the determination unit 4 to perform the processes from S309 to S314. In S309, the determination unit 4 determines whether or not the acquired region is present in the first encountered list; then, proceeds to the process in S311 in a case where the acquired region is present in the first encountered list and proceeds to the process in S310 in a case where the acquired region is not present in the first encountered list. In S310, the determination unit 4 refers to the criteria table 6 illustrated in FIG. 5B, sets a reading speed of 10 (characters/second) which is the criterion of the non-repetitive region for the acquired region, and proceeds to the process in S312. In S311, the determination unit 4 refers to the criteria table 6 illustrated in FIG. 5B, sets a reading speed of 20 (characters/second) which is the criterion of the repetitive region for the acquired region, and proceeds to the process in S312. In S312, the determination unit 4 determines whether or not the acquired region is the last region of the link target document; then, proceeds to the process in S314 in a case where the acquired region is the last region and proceeds to the process in S313 in a case where the acquired region is not the last region. In S313, the determination unit 4 acquires the next region of the acquired region and returns to the process in S309. In S314, the determination unit 4 performs determining that the link target document is read, displays the determination result on the output device 14, and ends the process. The process in S314 is illustrated by the processes from FIG. 8A to FIG. 8C in Example 1. The determination unit 4 may determine that a part or the entire of the link source document is read in a case where it is determined that a part or the entire of the link target document is read.

According to Example 4, the read determining device 10 identifies the region that is similar to the link source document as the similar region in the document including a link to another document, in the link target document. Since the read determining device 10 sets the reading speed which is faster than that of the dissimilar region for the similar region as the criterion even in the link target document, the predicted reading time of the similar region is set to be shorter than the predicted reading time of the dissimilar region. It is possible to avoid a case where the read determining device 10 counts the number of characters in the link target document such that even the number of characters in a region is added, into which a close look is not desired, a time, for which the link target document is read, is determined depending on the number of characters, and thus, it is determined that the region is not the read region if the time depending on the number of relevant characters is not displayed. That is, it is possible to determine whether or not the entire determination target document which includes the link target document is read, with accuracy.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A read determining device comprising:
    a memory, and
    a processor coupled to the memory and configured to execute a process comprising:
        identifying a similar portion in a document which is similar to a portion in the document or a similar portion in the document which is similar to a portion in another document which has already been read;
        measuring a duration of time a reader has been reading the document; and
        determining whether or not the document is read based on a comparison of the measured duration with a threshold value, wherein the threshold value is lowered with respect to the document which includes more similar portions than those in another document which includes less similar portions.

2. The read determining device according to claim 1, wherein the processor further comprises:
    predicting a reading-time of respective portions of the document, wherein a predicted reading time for a dissimilar portion is set to be longer than a predicted reading time for a similar portion based on an amount of information of the similar portion and an amount of information of the dissimilar portion which is not the similar portion,
    wherein, in the determining, the predicted reading time is used as the threshold value.

3. The read determining device according to claim 1, wherein, in the identifying, the similar portion is identified based on similarity of a character string.

4. The read determining device according to claim 1, wherein, in the identifying, the similar portion is identified based on similarity of meaning.

5. The read determining device according to claim 2, wherein, in the predicting, the predicted reading time is predicted depending on attributes of a user who refers to the similar portion.

6. The read determining device according to claim 1, wherein, in a case where a link to another document is included in the document, in the identifying, a similar portion in the other document that is similar to a portion in the document is identified, and
    wherein, in the determining, whether or not the other document is read is also determined.

7. The read determining device according to claim 6, wherein, in the determining, it is determined that the document is read when the other document is determined to be read.

8. The read determining device according to claim 2, wherein the process further comprises:
    detecting a user's line-of-sight position,
    wherein, in the measuring, a time that the line-of-sight position detected stays in the similar portion or the dissimilar portion is measured as the reference reading time.

9. A read determining method comprising:
    identifying a similar portion in a document which is similar to a portion in the document or a similar portion in the document which is similar to a portion in another document which has been read;
    measuring a duration of time a reader has been reading the document; and
    lowering a threshold value with which a document is determined to be read based on a comparison of the measured duration with the threshold value, with respect to the document which includes more similar portions than those in another document which includes less similar portions and thereby determining whether or not the document is read.

10. A non-transitory computer readable recording medium that causes a computer to execute:
    identifying a similar portion in a document which is similar to a portion in the document or a similar portion in the document which is similar to a portion in another document which has been read;
    measuring a duration of time a reader has been reading the document; and lowering a threshold value with which a document is determined to be read based on a comparison of the measured duration with the threshold value, with respect to the document which includes more similar portions than those in another document which includes less similar portions and thereby determining whether or not the document is read.

* * * * *